(12) United States Patent
Miller et al.

(10) Patent No.: US 12,394,867 B2
(45) Date of Patent: Aug. 19, 2025

(54) LEAD ACID BATTERY SEPARATORS, WARP RESISTANT SEPARATORS, BATTERIES, SYSTEMS, AND RELATED METHODS

(71) Applicant: Daramic, LLC, Charlotte, NC (US)

(72) Inventors: Eric H. Miller, Philpot, KY (US); Sterling Tucker Roe, Fort Mill, SC (US); William L. Walter, Owensboro, KY (US); Robert W. Saffel, Rockport, IN (US); Naoto Miyake, Kanagawa-ken (JP)

(73) Assignee: DARAMIC, LLC, Charlotte, NC (US)

( * ) Notice: Subject to any disclaimer, the term of this patent is extended or adjusted under 35 U.S.C. 154(b) by 423 days.

(21) Appl. No.: 17/268,945

(22) PCT Filed: Aug. 16, 2019

(86) PCT No.: PCT/US2019/046770
§ 371 (c)(1),
(2) Date: Feb. 16, 2021

(87) PCT Pub. No.: WO2020/037183
PCT Pub. Date: Feb. 20, 2020

(65) Prior Publication Data
US 2021/0313653 A1    Oct. 7, 2021

Related U.S. Application Data

(60) Provisional application No. 62/719,185, filed on Aug. 17, 2018.

(51) Int. Cl.
*H01M 50/463* (2021.01)
*H01M 4/14* (2006.01)
(Continued)

(52) U.S. Cl.
CPC ......... *H01M 50/463* (2021.01); *H01M 4/73* (2013.01); *H01M 4/745* (2013.01); *H01M 10/06* (2013.01);
(Continued)

(58) Field of Classification Search
CPC .. H01M 50/463; H01M 50/46; H01M 50/466; H01M 4/14; H01M 4/73;
(Continued)

(56) References Cited

U.S. PATENT DOCUMENTS 5,776,630 A * 7/1998 Bohnstedt ........... H01M 50/463
429/146
6,475,665 B1 * 11/2002 Okamoto ............ H01M 50/466
429/146
(Continued)

FOREIGN PATENT DOCUMENTS

FR       2466870 A1 *  4/1981
JP     2003178754 A *  6/2003
(Continued)

OTHER PUBLICATIONS

Merriam-Webster Dictionary definition of crimp (Year: 2011).*
(Continued)

*Primary Examiner* — Basia A Ridley
*Assistant Examiner* — Kimberly Wyluda
(74) *Attorney, Agent, or Firm* — J. Clinton Wimbish; Maynard Nexsen PC

(57) ABSTRACT

Disclosed herein are exemplary embodiments of improved electrode plate and separator assemblies (400) for lead acid batteries, improved lead acid cells or batteries incorporating the improved assemblies, systems or vehicles incorporating the improved assemblies (400) and/or batteries (100), and methods related thereto. The electrode plate (200, 201) may have a grid (202) of a stamped, cast, or expanded metal manufacturing process. The grid (202) may have a non-uniform application of active material (203). The separators (300) preferably provide a support structure for resisting or mitigating any plate warping or plate deflection.

13 Claims, 15 Drawing Sheets

(51) Int. Cl.
  *H01M 4/73* (2006.01)
  *H01M 4/74* (2006.01)
  *H01M 10/06* (2006.01)
  *H01M 50/46* (2021.01)
  *H01M 50/466* (2021.01)

(52) U.S. Cl.
  CPC ......... *H01M 50/46* (2021.01); *H01M 50/466* (2021.01); *H01M 4/14* (2013.01); *H01M 2220/10* (2013.01); *H01M 2220/20* (2013.01)

(58) Field of Classification Search
  CPC .. H01M 4/745; H01M 10/06; H01M 2220/10; H01M 2220/20
  See application file for complete search history.

(56) References Cited

U.S. PATENT DOCUMENTS

| | | | | |
|---|---|---|---|---|
| 2002/0034684 | A1* | 3/2002 | Muller-Rinke | H01M 50/463 429/143 |
| 2012/0070747 | A1 | 3/2012 | Whear et al. | |
| 2013/0029203 | A1* | 1/2013 | Ross | H01M 4/14 429/211 |
| 2015/0099189 | A1* | 4/2015 | Ketzer | H01M 4/14 429/246 |
| 2017/0098810 | A1* | 4/2017 | Whear | H01M 50/44 |
| 2019/0088931 | A1* | 3/2019 | Abrahamson | H01M 4/663 |

FOREIGN PATENT DOCUMENTS

| | | | |
|---|---|---|---|
| RU | 2271055 C2 | 2/2006 | |
| RU | 2584699 C1 | 5/2016 | |
| WO | WO-2017062053 A1 * | 4/2017 | ........... G01R 31/374 |
| WO | WO 2017/123190 | 7/2017 | |

OTHER PUBLICATIONS

EPO machine generated English translation of FR2466870A1 (Year: 1981).*
EPO machine generated English translation of JP-2003178754-A (Year: 2003).*
Written Opinion dated Nov. 26, 2019; from counterpart PCT Application No. PCT/US 2019/046770.
Search Report dated Nov. 26, 2019; from counterpart PCT Application No. PCT/US 2019/046770.
IPRP dated Feb. 23, 2021; from counterpart PCT Application No. PCT/US 2019/046770.

* cited by examiner

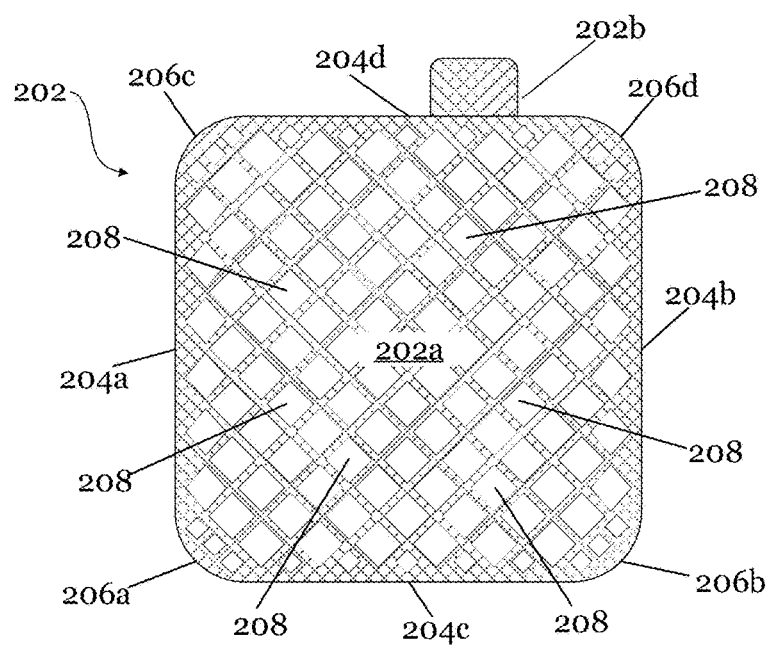
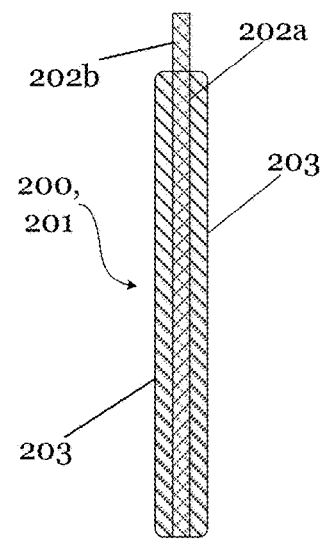
*Fig. 3*  *Fig. 4A*
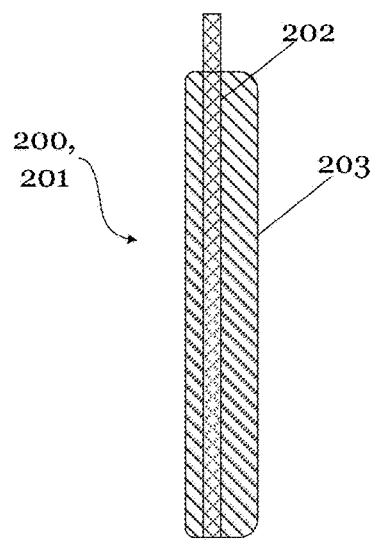
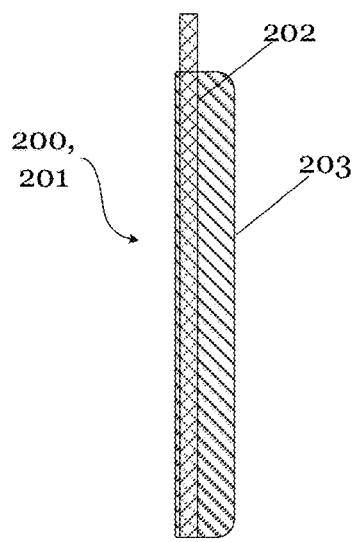
*Fig. 4B*  *Fig. 4C*

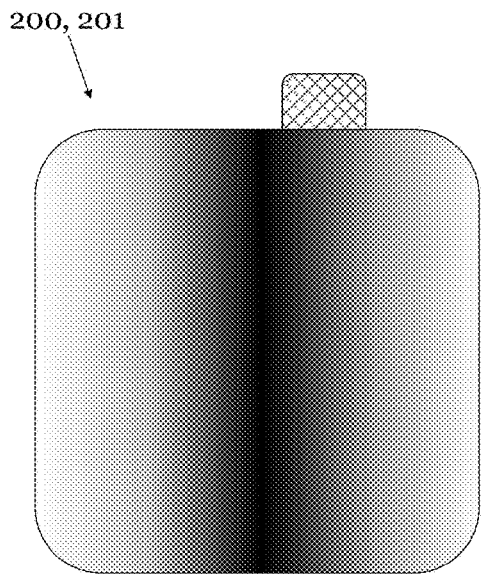
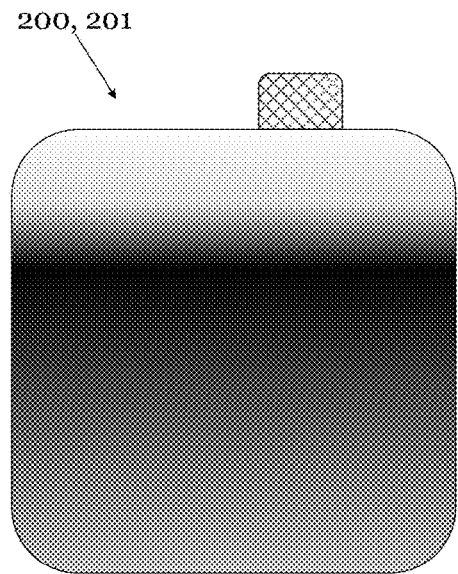
Fig. 4D                                  Fig. 4E
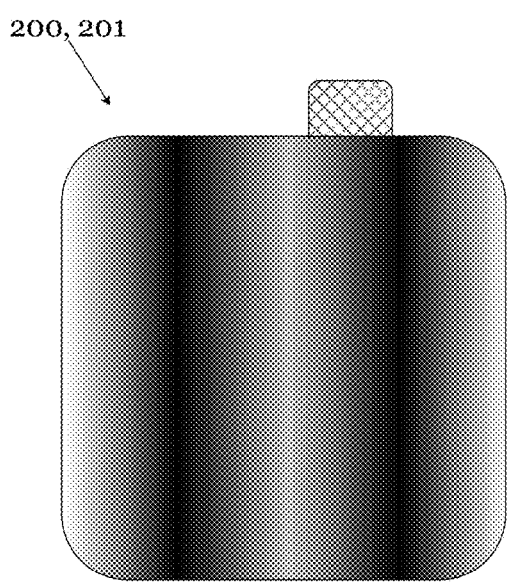
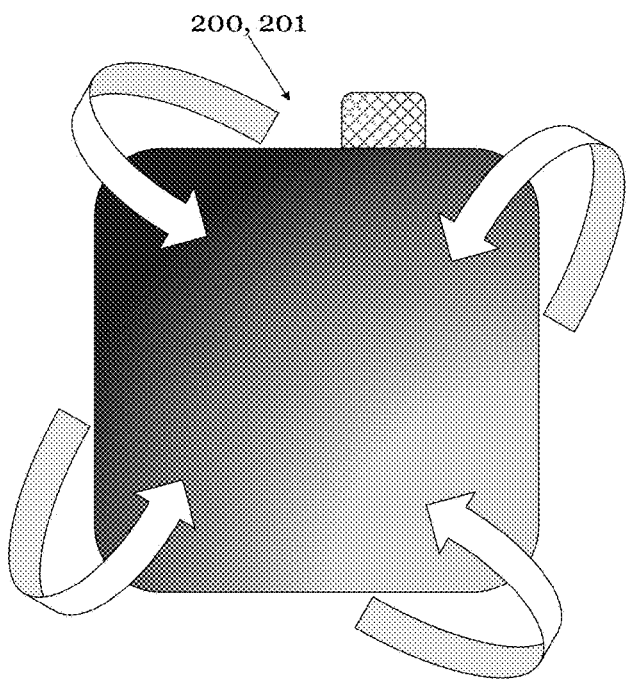
Fig. 4F                                  Fig. 4G section 5A-5A

LEAD ACID BATTERY SEPARATORS, WARP RESISTANT SEPARATORS, BATTERIES, SYSTEMS, AND RELATED METHODS

RELATED APPLICATIONS

This application is a 371 US Applications claiming priority to PCT/US2019/046770, filed Aug. 16, 2019, which claims priority to and benefit of U.S. Provisional Patent App. No. 62/719,185, filed on Aug. 17, 2018, which are hereby incorporated herein by reference in their entirety.

FIELD

The present disclosure is directed to novel or improved separators for a variety of lead acid batteries and/or systems. In addition, exemplary embodiments disclosed herein are directed to novel or improved battery separators, warp resistant separators, battery cells incorporating the same, batteries incorporating the same, systems incorporating the same, and/or methods of manufacturing and/or of using the same, novel or improved lead acid batteries, and/or the like, and/or combinations thereof. At least selected embodiments are directed to novel or improved separators, batteries, and/or systems, such as those having or operating with a stamped plate electrode, a stamped grid electrode, a warped plate electrode, or a plate electrode prone to warping utilizing the novel or improved separator, which provides for enhanced battery life, and/or reduced battery failure in lead acid batteries.

BACKGROUND

As lead acid batteries find their way into more and more applications and systems, size and weight are major considerations in their design. The goal being to reduce battery size and/or weight while at least maintaining or even increasing the capacity of their larger predecessors. The positive electrode plates are typically constructed of a lead dioxide ($PbO_2$) (or an alloy thereof) grid doped with a positive active material ("PAM"). The negative electrode plates are typically constructed of a lead (Pb) (or an alloy thereof) grid doped with a negative active material ("NAM"). With lead (Pb) being the heaviest and most expensive element in a lead acid battery, battery designers are continuously looking to reduce the amount of lead in the battery to achieve the aforementioned goals. Historically, electrode grids were cast, which created a rather thick electrode. The industry later moved to an expanded metal process, which yielded a thinner electrode than that created by the cast grid process. Presently, some modern batteries are being constructed with grids that are stamped, which yields even thinner electrodes than any previously known process.

While all the aforementioned grid forming processes have, by at least some amount, effected plate warping, no process has yielded warped plates at the rate and severity as that seen in plates constructed with stamped grids. Warped plates create pinch points that can puncture separators and lead to battery shorts. Previous methods to mitigate the effects of warped plates have focused on the design of the grid itself. However, at least certain of these methods have yet to fully solve the problems associated with plate warping. As of yet, the present inventors know of no means that utilize a battery separator to solve the aforementioned problems.

For at least certain applications or batteries, such as the aforementioned exemplary conditions, there remains a need for improved separators providing for reduced battery failure, improved battery cycle life, and/or improved performance in a partial state of charge, and/or the like. More particularly, there remains a need for improved separators, improved batteries, and improved systems, such as those having separators with increased durability, separators with decreased occurrences of punctures, batteries with reduced instances of shorting, reduced water loss in a battery, lower battery float current, improved battery operation at a partial state of charge, enhanced battery life, reduced battery failure, improved batteries utilizing improved separators, systems utilizing improved batteries utilizing improved separators, and/or the like. More particularly, there remains a need for improved separators, improved batteries, and improved systems, such as those operating with a stamped plate, a stamped grid, non-uniform active material, a warped plate, or a plate prone to warping utilizing an improved separator, which provides for enhanced battery life, and/or reduced battery failure in lead acid batteries.

SUMMARY

The details of one or more exemplary embodiments, aspects, or objects, are in the detailed description and claims set forth hereinafter. Other features, objects, and advantages will be apparent from the detailed description and claims set forth hereinafter. In accordance with one or more select embodiments, aspects, or objects, the present disclosure or invention at least addresses, and in some cases exceeds, the above problems, issues, or needs.

In accordance with at least select exemplary embodiments, aspects, or objects, the present disclosure or invention may address at least the aforementioned problems, issues or needs, and/or may provide novel or improved separators, warp resistant separators, and/or lead acid battery separators, novel or improved cells or batteries utilizing the novel or improved separators, and/or novel or improved systems utilizing the novel or improved separators, cells or batteries. In accordance with at least certain exemplary embodiments, aspects, or objects, the present disclosure or invention is directed to novel or improved battery separators, battery cells, batteries, systems, and/or methods of manufacture and/or methods of use of such novel or improved battery separators, battery cells, batteries, and/or systems.

In accordance with at least certain exemplary embodiments, aspects, or objects, the present disclosure or invention is directed to improved separators for lead acid batteries having at least an improved formulation and rib configuration for reducing or mitigating electrode plate warping and/or the effects of electrode plate warping; reduced occurrences of separator punctures; reduced occurrences of battery electrode shorting; and/or the like; and/or combinations thereof. In accordance with at least certain exemplary embodiments, aspects, or objects, the present disclosure or invention is directed to improved separators for lead acid batteries that may be characterized by at least one or more of: plate-warp resistant; puncture resistant; oxidation resistant; acid mixing; reduced electrical resistance; improved wettability; improved fillers; optimized porosity; optimized tortuosity; reduced thickness; reduced backweb thickness; ribbed; negative cross-ribs; reduced oil content; increased acid diffusion; increased oxidation resistance or improved oxidation stability; optimized porosity; optimized pore tortuosity; improved acid diffusion; and/or the like; and/or combinations thereof. In accordance with at least certain exemplary embodiments, aspects, or objects, the present disclosure or invention is directed to improved separators for lead acid batteries that may provide for at least one or more of: low water loss in a battery and/or battery cell; decreased electrical resistance in a battery and/or battery cell; increased acid mixing in a battery and/or battery cell; reduced acid stratification in a battery and/or battery cell; improved performance in a battery and/or battery cell; increased life in a battery and/or battery cell, reduced failure rates in a battery and/or battery cell; and/or the like; and/or combinations thereof.

In accordance with at least certain exemplary embodiments, aspects, or objects, the present disclosure or invention is directed to separators, and/or improved battery cells and/or batteries utilizing improved separators, and/or improved systems utilizing improved battery cells and/or batteries utilizing improved separators that overcome at least the aforementioned problems and/or issues. For instance, and by way of example only, improved battery cells and/or batteries may be characterized by at least one or more of: enhanced performance; reduced failure rates; improved life; decreased occurrences of plate shorting; decreased occurrences of separator punctures; reduced water loss, reduced float current; improved end-of-charge current; increased charge acceptance; improved energy throughput; reduced antimony (Sb) poisoning; reduced acid stratification, reduced acid starvation; reduced dendrite formation; reduced internal electrical resistance; improved cold cranking amps ("CCA"), improved uniformity; improved cycling performance; and/or the like; and/or combinations thereof.

In accordance with at least select exemplary embodiments, aspects, or objects, the present disclosure or invention is at least directed to novel or improved battery separators, warp resistant separators, puncture resistant separators, resilient separators, battery cells, batteries, methods involving the same, systems using the same, vehicles using the same, methods of manufacturing the same, the methods using the same, and combinations thereof.

In accordance with at least certain exemplary embodiments, aspects, or objects, the present disclosure or invention is directed to novel or improved battery separators as used in a variety of batteries and/or applications. An exemplary list of such batteries and/or applications includes: flat-plate batteries; tubular batteries; flooded lead acid batteries; enhanced flooded lead acid batteries ("EFBs"); valve regulated lead acid ("VRLA") batteries; deep-cycle batteries; gel batteries; absorptive glass mat ("AGM") batteries, inverter batteries; power collections batteries; power storage batteries; batteries for internal combustion engines; auxiliary batteries; starting-lighting-ignition ("SLI") batteries; idle-start-stop ("ISS") batteries; vehicle batteries; passenger vehicle batteries; automobile batteries; truck batteries; motorcycle batteries; all-terrain vehicle batteries; marine batteries; aircraft batteries, forklift batteries; golf cart or golf car batteries; hybrid-electric vehicle ("HEV") batteries; micro-hybrid vehicle batteries; electric vehicle batteries; e-rickshaw batteries; e-trike batteries; e-bike batteries; uninterruptible power supply ("UPS") batteries; batteries with high CCA requirements; batteries operating in a partial state of charge ("PSoC"); and/or the like; and combinations thereof.

In accordance with at least selected exemplary embodiments, aspects, or objects, a plethora of systems having an inventive battery incorporating an inventive separator as described herein are provided. The exemplary system may be one or more of: a vehicle; an UPS; an auxiliary power system; a power collector system; a renewable energy power collector system; a wind energy power collector system; a solar energy power collector system; a backup power system; an inverter; and combinations thereof. Further, exemplary vehicles may be one of: an automobile; a passenger vehicle; a truck; a forklift; a hybrid vehicle; a HEV; a micro-hybrid vehicle, an ISS vehicle; an electric vehicle; a water vessel; an aircraft; an e-rickshaw; an e-trike; an e-bike; a motorcycle; an all-terrain vehicle; a golf cart or golf car; and/or the like; and combinations thereof.

In a first exemplary embodiment of the present disclosure or invention, an electrode and separator assembly is provided with an electrode plate having a grid and an active material thereon. The grid is provided with at least one grid edge. Furthermore, the active material may be non-uniformly distributed on the grid. In another embodiment, the grid may be thinner than approximately 1.00 mm. In yet another embodiment, the grid may have a non-uniform geometry.

A porous membrane is provided disposed adjacent to the electrode plate with a first membrane surface. The first membrane surface has a first surface edge and a second surface edge and a plurality of ribs extending from the membrane surface; the plurality of ribs extending from the first surface edge to the second surface edge.

In another exemplary embodiment of the present invention or disclosure, an electrode and separator assembly is provided with an electrode plate, which may be either a positive electrode or a negative electrode, having a grid and an active material non-uniformly distributed thereon. The grid is provided with a first grid edge and a second grid edge. A porous membrane is disposed adjacent to the electrode plate. The porous membrane has a first side lane adjacent to a first membrane edge and a second side lane adjacent to a second membrane edge, and a central portion disposed between the first side lane and the second side lane. The porous membrane is provided with a first membrane surface having a plurality of primary ribs extending from or into the first membrane surface within the central portion, and a first array of secondary ribs disposed within the first side lane and a second array of secondary ribs disposed within the second side lane.

In one aspect of the present invention, the first grid edge may be disposed within the first side lane, and the second grid edge may be disposed within the second side lane. The plurality of primary ribs may have a uniform height and a uniform distribution. Whereas either or both of the first array of secondary ribs and the second array of secondary ribs are more closely spaced that the plurality of primary ribs. The plurality of primary ribs, the first array of secondary ribs, and/or the second array of secondary ribs may be longitudinally disposed and substantially parallel to the machine direction of the porous membrane or laterally disposed and substantially parallel to the cross-machine direction of the porous membrane. Either or both of the first array of secondary ribs and the second array of secondary ribs may substantially parallel to, orthogonal to, or angled with respect to the plurality of primary ribs. The porous membrane may have a second membrane surface having a third array of ribs thereon.

In another aspect of the present invention, the grid may be either a stamped grid, a cast grid, or an expanded metal grid. Furthermore, the grid may be subject to warping. The grid may have a first grid surface and a second grid surface, and wherein the active material may be more heavily distributed on the first grid surface as compared to the second grid surface. Furthermore, the active material may be non-uniformly distributed on a surface of the grid.

In yet another aspect, any of the plurality of primary ribs, the first array of secondary ribs, the second array of secondary ribs, and/or the third array of ribs may be one or more of: solid ribs, discrete broken ribs, continuous ribs, discontinuous ribs, discontinuous peaks, discontinuous protrusions, angled ribs, diagonal ribs, linear ribs, ribs that may be longitudinally extending substantially in a machine direction of the porous membrane, ribs that may be laterally extending substantially in a cross-machine direction of the porous membrane, ribs that may be transversely extending substantially in the cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

In certain embodiments, the porous membrane may be one of an envelope, and a hybrid envelope, a sleeve separator, a pocket separator, and a wrap separator. The porous membrane may have at least one sealed edge formed from a crimp, a weld, an ultrasonic weld, a thermal weld, an adhesive, and combinations thereof. The porous membrane may also be a cut-piece.

In another exemplary embodiment of the present invention or disclosure, an electrode and separator assembly is provided with an electrode plate, which may be either a positive electrode or a negative electrode, having a grid and an active material non-uniformly distributed thereon. A porous membrane may be provided with a first membrane surface having an array of primary ribs disposed thereon and extending from a first membrane edge to a second membrane edge; wherein the array of primary ribs have a uniform height.

Another aspect of the present invention or disclosure provides the grid with a first grid surface and a second grid surface, with the active material more heavily distributed on the first grid surface as compared to the second grid surface. Alternatively, or in addition to, the active material may be non-uniformly distributed on a surface of the grid. The grid may be one of the group consisting of a stamped grid, a cast grid, and an expanded metal grid. In addition, the grid may be subject to warping. Either of the first membrane surface or the second membrane surface may be adjacent to the electrode plate.

In another aspect of the present invention or disclosure, the array of primary ribs may be disposed longitudinally and substantially parallel to a machine direction of the porous membrane and may be uniformly or non-uniformly laterally spaced across a cross-machine direction of the porous membrane. The porous membrane is provided with a second surface and a second array of ribs may extend therefrom.

In another aspect of the present invention or disclosure, either or both of the array of primary ribs and/or the second array of ribs may be one or more of: solid ribs, discrete broken ribs, continuous ribs, discontinuous ribs, discontinuous peaks, discontinuous protrusions, angled ribs, diagonal ribs, linear ribs, ribs that may be longitudinally extending substantially in a machine direction of the porous membrane, ribs that may be laterally extending substantially in a cross-machine direction of the porous membrane, ribs that may be transversely extending substantially in the cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

In one exemplary aspect, the porous membrane may be one of an envelope separator, a hybrid envelope separator, a sleeve separator, a pocket separator, a wrap separator, a cut-piece separator, and a leaf separator; wherein the envelope, hybrid envelope, sleeve separator, pocket separator, and wrap separator may have at least one sealed edge formed from a crimp, a weld, an ultrasonic weld, a thermal weld, an adhesive, and combinations thereof.

In yet another exemplary embodiment of the present invention or disclosure, an electrode and separator assembly may be provided with an electrode plate provided with a grid and active material. the grid may have a first grid edge and a second grid edge, and the active material may be non-uniformly distributed on the grid. A porous membrane further may be provided with a first membrane surface with a support structure supporting the first grid edge and the second grid edge. The first grid edge may have at least a first grid corner, and the second grid edge may have at least a second grid corner. The support structure may have a first array of ribs having a uniform height.

The grid may have a first grid surface and a second grid surface, wherein the active material may be more heavily distributed on the first grid surface as compared to the second grid surface. Alternatively, or in addition to, the active material may be non-uniformly distributed on a surface of the grid. The grid may be one of the group consisting of a stamped grid, a cast grid, and an expanded metal grid. The electrode plate may be subject to warping.

In certain exemplary aspects, the first array of ribs may be uniformly spaced laterally from a first membrane edge of the porous membrane to a second membrane edge of the porous membrane. The first array of ribs may also be uniformly or non-uniformly spaced laterally from a first membrane edge of the porous membrane to the second membrane edge of the porous membrane.

In other exemplary aspects of the present disclosure, the first array of ribs may be more closely spaced in a first membrane area adjacent to the first membrane edge and more closely spaced in a second membrane area adjacent to the second membrane edge as compared to a rib spacing in a center portion of the porous membrane.

In yet another exemplary aspect of the present disclosure, the first array of ribs may be uniformly or non-uniformly spaced laterally from a first grid edge to a second grid edge. In addition, the first array of ribs may be more closely spaced in a first area adjacent to the first grid edge and more closely spaced in a second area adjacent to the second grid edge as compared to a rib spacing in a center portion of the grid.

In yet another aspect of the present disclosure, the support structure may have a fibrous mat; the fibrous mat may extend from the first grid edge to the second grid edge. The support structure may have a first fibrous mat adjacent to the first grid edge, and a second fibrous mat adjacent to the second grid edge.

In another exemplary aspect, the porous membrane may be one of an envelope separator, a hybrid envelope separator, a sleeve separator, a pocket separator, a wrap separator, a cut-piece separator, and a leaf separator; wherein the envelope, hybrid envelope, sleeve separator, pocket separator, and wrap separator may have at least one sealed edge formed from a crimp, a weld, an ultrasonic weld, a thermal weld, an adhesive, and combinations thereof.

In yet another exemplary embodiment of the present disclosure, a lead acid battery may be provided with a separator as substantially described herein. The lead acid battery may operate in one of the following states of being in motion, stationary, in a backup power application, in deep-cycling applications, in cycling applications, in a partial state of charge, and combinations thereof.

Exemplary batteries may be one of: a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idle-start-stop ("ISS") vehicle battery, an automobile battery, a truck battery, a marine battery, a motorcycle battery, an all-terrain vehicle battery, a forklift battery, a golf cart battery, a hybrid-electric vehicle battery, an electric vehicle battery, an e-rickshaw battery, an e-trike battery, and an e-bike battery.

In yet another exemplary embodiment a system may be provided with a lead acid battery as described herein. The system may be provided with a vehicle, wherein the vehicle may be one of an automobile, a truck, a motorcycle, an all-terrain vehicle, a forklift, a golf cart, a hybrid vehicle, a hybrid-electric vehicle, an electric vehicle, an idle-start-stop ("ISS") vehicle, a water vessel, an e-rickshaw, an e-trike, and an e-bike. Furthermore, the system may operate in one of the following states: in motion, stationary, in a backup power application, in a deep-cycle application, in cycling applications, in a partial state of charge, and combinations thereof. The system further may be one of the following: an uninterruptible power supply, an energy reserve system, a power backup system, a renewable energy storage system, and combinations thereof.

In still another exemplary embodiment, a method for mitigating grid warp in an electrode and separator assembly may be provided. The method may provide an electrode plate with a grid susceptible to warping; and positioning a support structure adjacent to the grid. The support structure may include a battery separator. Additionally, the support structure may include a fibrous mat or mesh. An active material may be non-uniformly applied to the grid. The grid may have a perimeter. The support structure may overlap at least a portion of the grid perimeter. The support structure may be provided as a set of ribs extending from the porous membrane having a uniform height. The set of ribs may be longitudinally disposed in a machine direction of the porous membrane and the set of ribs may be evenly spaced from a first edge of the perimeter to a second edge of the perimeter in a lateral dimension in a cross-machine direction. Alternatively, or in addition to, the support structure may have or be a polygonal spacer. Alternatively, or in addition to, the support structure may have or be a fibrous mat. Alternatively, or in addition to, the support structure may have or be a first fibrous mat and a second fibrous mat, wherein the first fibrous mat is disposed to at least partially overlap a first edge of the perimeter, and the second fibrous mat is disposed to at least partially overlap a second edge of the perimeter. The method may further provide subjecting the electrode and separator assembly to elevated temperatures and/or thermal cycling.

In accordance with at least selected exemplary embodiments, aspects, or objects, the present disclosure or invention provides a separator whose components and physical attributes and features synergistically combine to address, in unexpected ways, previously unmet needs in the lead acid battery industry with an improved battery separator. In certain preferred exemplary embodiments, the present disclosure or invention provides a battery using a separator as described herein to address, in unexpected ways, previously unmet needs in the lead acid battery industry with an improved lead acid battery separator. In certain preferred exemplary embodiments, the present disclosure or invention provides a system using a battery as described herein to address, in unexpected ways, previously unmet needs in the lead acid battery industry with an improved system utilizing an inventive lead acid battery that utilizes an inventive separator as described herein.

In accordance with at least selected exemplary embodiments, aspects, or objects, the present invention solves, meets, and/or overcomes at least the problems, needs, and/or issues, which have heretofore been unsolved, unmet, and/or not addressed by the current state of the art. In accordance with at least certain objects, the present invention provides an improved separator, an improved battery utilizing the improved separator, and/or an improved system using the improved battery that overcome at least the aforementioned problems.

BRIEF DESCRIPTION OF THE FIGURES

FIG. 3 shows an exemplary lead acid battery plate.

FIGS. 4A-4G illustrate lead acid battery plates with various types of applied active material.

FIG. 7A illustrates a separator as generally shown in FIGS. 1B and 1C. FIG. 7B illustrates a separator as generally shown in FIG. 6A. FIG. 7C illustrates a separator as generally shown in FIG. 6B.

The same or corresponding elements or parts are designated with like references throughout the figures. Furthermore unless otherwise denoted, no figure should be construed as being to scale. Dimensions denoted in the various figures are in millimeters.

DETAILED DESCRIPTION

In accordance with at least select exemplary embodiments, objects, or aspects, the present disclosure or invention addresses, and in some cases exceeds, the aforementioned issues or needs. In accordance with at least certain exemplary embodiments, objects, or aspects, the present disclosure or invention may provide improved separators, and battery cells and/or batteries using the same; and/or related systems using the same; and/or related methods using the same. In accordance with at least select exemplary embodiments, aspects, or objects, the present disclosure or invention is at least directed to novel or improved battery separators being characterized by one or more of plate-warp resistant separators; puncture resistant separators; resilient separators; battery cells; batteries, related methods using or involving the same; related systems using or involving the same; related vehicles using or involving the same; methods of manufacturing the same; and/or the like; and/or combinations thereof. In accordance with at least select exemplary embodiments, aspects, or objects, the present disclosure or invention is directed to one or more novel or improved battery cells and/or batteries characterized by one or more of: enhanced performance; reduced failure rates; improved life; decreased occurrences of plate shorting; decreased occurrences of separator punctures; and/or the like; and/or combinations thereof.

Figure 1A:
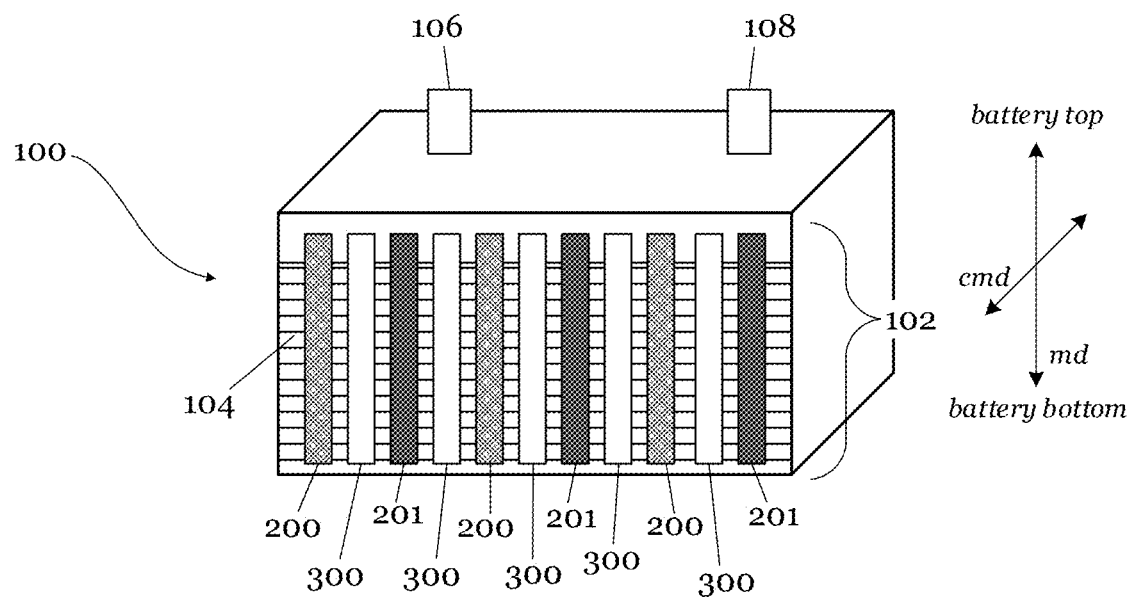
FIG. 1A is a schematic illustration of a typical lead acid battery.

With reference now to FIG. 1A, an exemplary lead acid battery 100 has an array 102 of alternating positive electrode plates 200 (or positive plates) and negative electrode plates 201 (or negative plates) with separators 300 interleaved between each electrode 200, 201. The array 102 is substantially submerged in an electrolyte 104. The electrolyte 104 may be, for example, a solution of sulfuric acid ($H_2SO_4$) and water ($H_2O$). The electrolyte solution may have, for example, a specific gravity of approximately 1.28, with a range of approximately 1.215 to approximately 1.300. The battery 100 is further provided with a positive terminal 104 in electrical communication with the positive plates 200 and a negative terminal 106 in electrical communication with the negative plates 201.

Figure 1B:
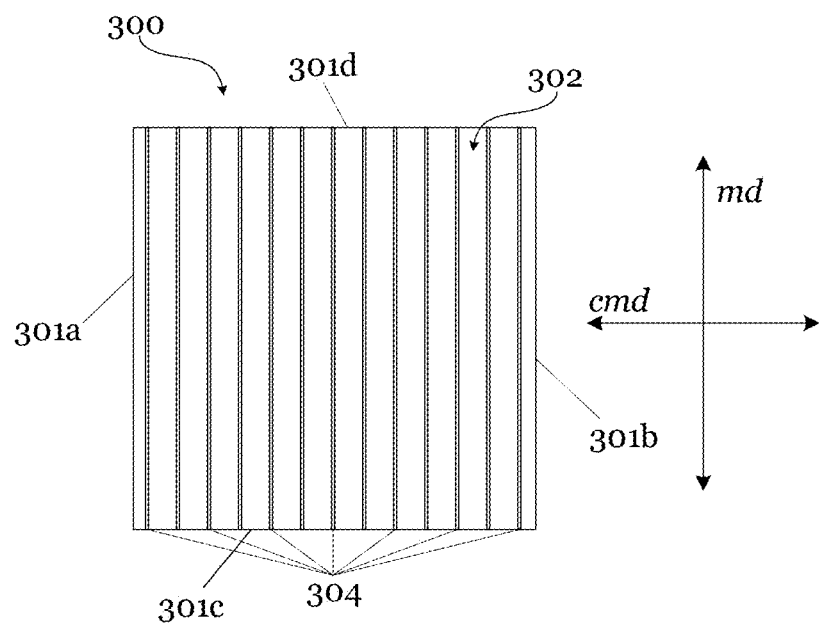
FIG. 1B depicts rib patterns longitudinally disposed on the separator, in a machine direction md.
Figure 1C:
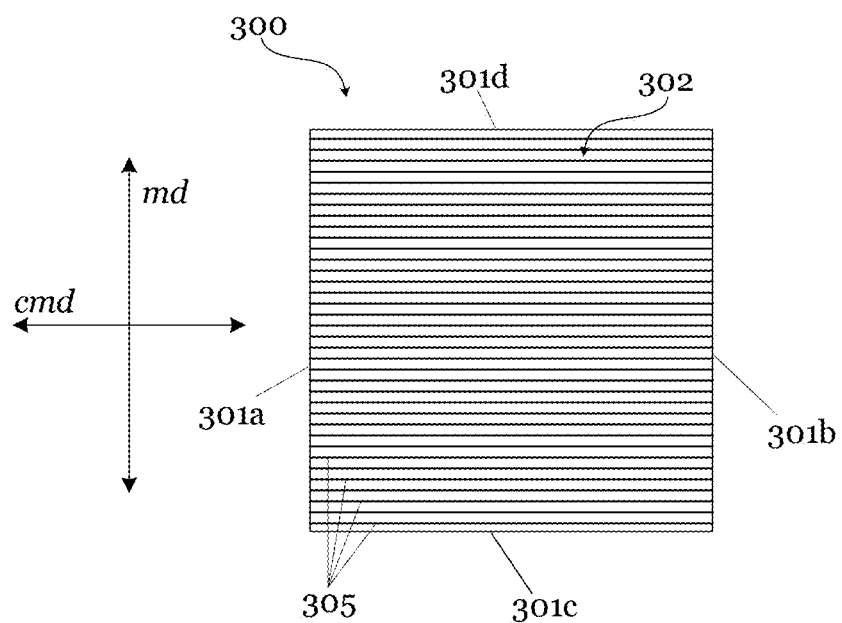
FIG. 1C depicts rib patterns laterally disposed on the separator, in a cross-machine direction cmd.

With reference to FIGS. 1B and 1C, exemplary separators 300 may be provided with a porous membrane backweb 302 with an array of ribs 304, 305 extending therefrom. As shown in FIG. 1B, an exemplary first array of ribs 304 is disposed longitudinally in a machine direction md of the separator 300. As shown in FIG. 1C, an exemplary second array of ribs 305 is disposed laterally in a cross-machine direction cmd of the separator 300 and as such may be called cross ribs. When disposed within a battery, exemplary separators 300 may place the first array of ribs 304 adjacent to a positive electrode plate 200 and be referred to as positive ribs 304, while the second array of ribs 305 are adjacent to a negative electrode plate 201 and be referred to as negative ribs, or vice versa. As shown in FIG. 1C, the second array of ribs may be referred to as cross ribs as they extend in the cross-machine direction cmd (e.g., "negative cross ribs" if they face a negative electrode plate 201) Furthermore, either array of ribs 304, 305 may face either electrode plate 200, 201 when disposed within a battery 100.

Either array of ribs 304, 305 may be configured in a plethora of configurations, shapes, profiles, or patterns, which may be a uniform set, an alternating set, or a mix or combination of solid ribs, discrete broken ribs, continuous ribs, discontinuous ribs, discontinuous peaks, discontinuous protrusions, angled ribs, diagonal ribs, linear ribs, ribs that are longitudinally extending substantially in a machine direction md of the separator (i.e., running from top to bottom of the separator 300 in the battery), ribs that are laterally extending substantially in a cross-machine direction cmd of the separator (i.e., in a lateral direction of the separator 300 in the battery), orthogonal to the machine direction md), ribs that are transversely extending substantially in said cross-machine direction cmd of the separator 300, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof. The ribs 304, 305 are further described herein.

Figures 2A, 2B:
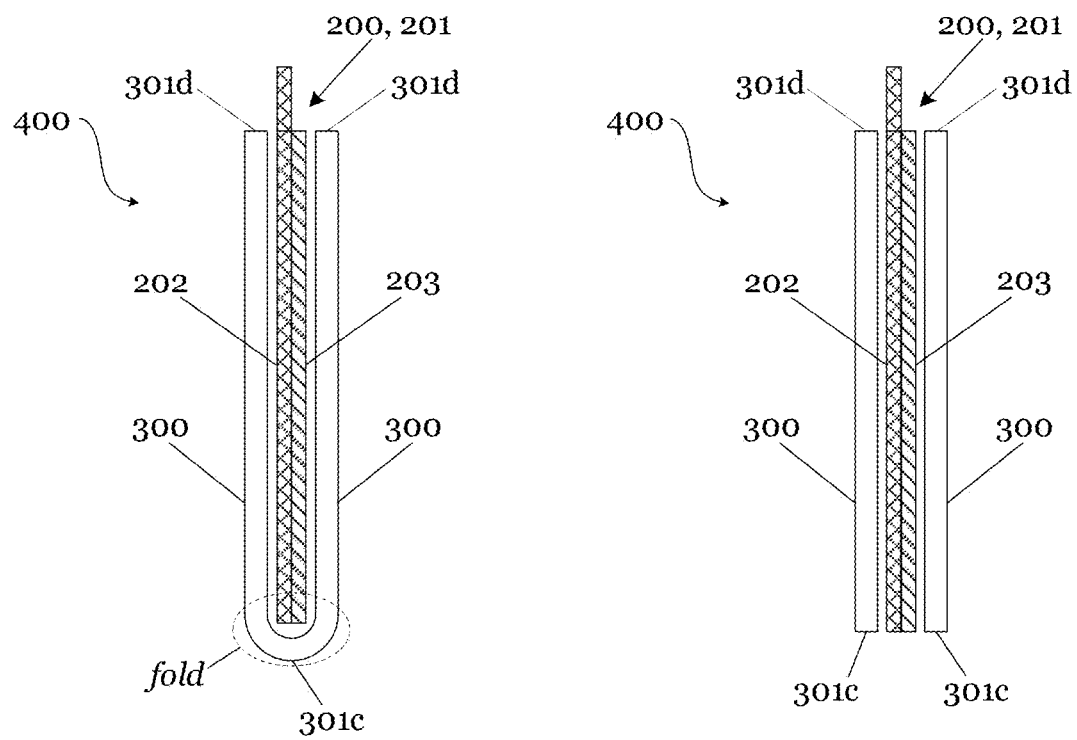
FIGS. 2A and 2B show exemplary electrode and separator assemblies.

FIGS. 2A and 2B depict two exemplary electrode/separator assemblies 400 as side cross-sectional views as viewed along an axis substantially parallel to the cross-machine direction of the separator. FIG. 2A shows an exemplary electrode/separator assemblies 400 with a typical wrap or envelope separator. FIG. 2B shows an exemplary electrode/separator assemblies with a representative leaf or cut piece separator. Exemplary embodiments of the disposition of the separator within the battery are further described herein.

Plate Construction

With reference to FIG. 2A through FIG. 4G, the electrode plates 200, 201 are at least made with a grid 202 and an active material 203. The grid 202 may be made in a variety of methods, such as by cast metal, expanded metal, and stamped metal. In addition, the various grids within a battery may be made with different methods from one another. For instance, the positive grids may be stamped while the negative grids are expanded metal. As stated hereinabove, stamped grids use less lead than the other methods and are therefore more cost effective. While stamped grids reduce cost, thinner plates have a greater tendency to warp, distort, bend, twist, bow, and/or cup. Furthermore, grids with non-uniform geometries and non-uniformly distributed active material also have a greater tendency to warp, distort, bend, twist, bow, and/or cup. This leads to the potential for pinch points, wear points, or puncture points. As the plate(s) cuts or punctures through the separator it may, and is highly likely to, contact adjacent plates and short the battery and/or battery cell. While not wishing to be limited by theory, the inventors believe that grids thinner than approximately 1.00 mm are likely to warp, preferably grids thinner than approximately 0.85 mm, and more preferably grids thinner than approximately 0.70 mm are the most likely to warp.

As used herein, throughout the description and in the claims, the term "warp," and variants thereof, in addition to having its normal and customary meaning, may be used interchangeably with at least the following terms and their variants: distort, bend; twist; bow; and/or cup, which shall also have their normal and customary meaning.

With continued references to FIG. 2A through FIG. 4G, the grids 202 are typically doped or pasted with active material 203. The positive plates 200 are typically doped with a positive active material ("PAM"), and the negative plates 201 are typically doped with a negative active material ("NAM"). The active material 203 increases the functionality of the grid.

With reference now to FIG. 3, a typical grid 202 is provided with a main grid portion 202a and a connector 202b for a lead strap within a battery. An exemplary typical main grid portion 202a has a first vertical side edge 204a, a second vertical side edge 204b, a bottom horizontal edge 204c, and a top horizontal edge 204d. A typical main grid portion 202a is further provided with four corners 206a, 206b, 206c, 206d that may or may not be rounded. The main grid portion 202a is further provided with a lattice work creating a series of openings through the grid 208. This helps reduce weight and material and better utilizes the entire grid during the electrochemical reactions of the battery.

Referring now to FIGS. 4A through 4G, plates 200, 201 are shown with grids 202 having active material 203 imperfectly deposited thereon in varying degrees of uniformity. FIGS. 4A through 4C are side views of plates 200, 201. FIG. 4A shows a substantially uniform distribution of active material 203 on a grid 202. FIG. 4B shows a slightly uneven distribution with more active material 203 on the right side of the grid 202 as opposed to the left side. FIG. 4C shows a more severe uneven distribution with more active material 203 on the right side of the grid 202 as opposed to the left side. FIGS. 4D through 4G show exemplary plates 200, 201 with imperfect distributions of active material across the face of the grid. The darker areas may represent a heavier application of active material than the lighter areas. FIG. 4D depicts a symmetrical distribution of active material. FIG. 4E illustrates an asymmetrical distribution of active material. FIG. 4F shows a bi-modal symmetrically distributed active material. FIG. 4G depicts exemplary ways in which a plate 200, 201 may warp as noted by the arrows. It is appreciated that a warped plate 200, 201 may be warped, curved, or bent along or about any axis relative to the grid 202. It is further appreciated that a warped plate 200, 201 may be warped, curved, or bent along or about multiple axes relative to the grid 202.

Figure 5A:
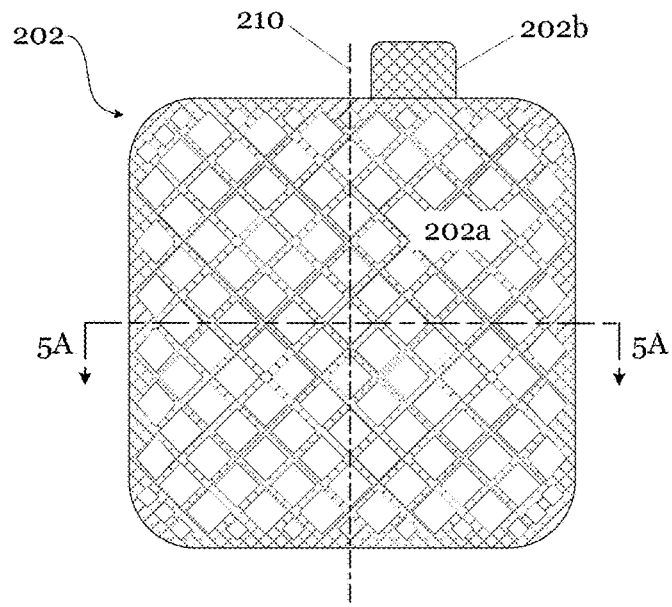
FIG. 5A is a plan-view of a warped plate.
Figure 5B:
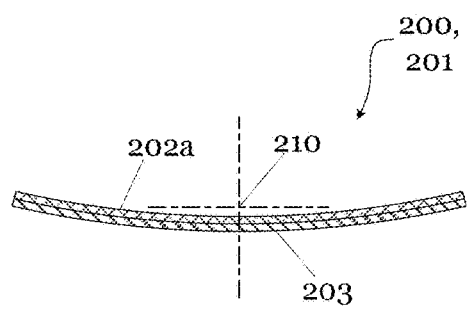
FIG. 5B is a side view of the warped plate of FIG. 5A.
Figure 5C:
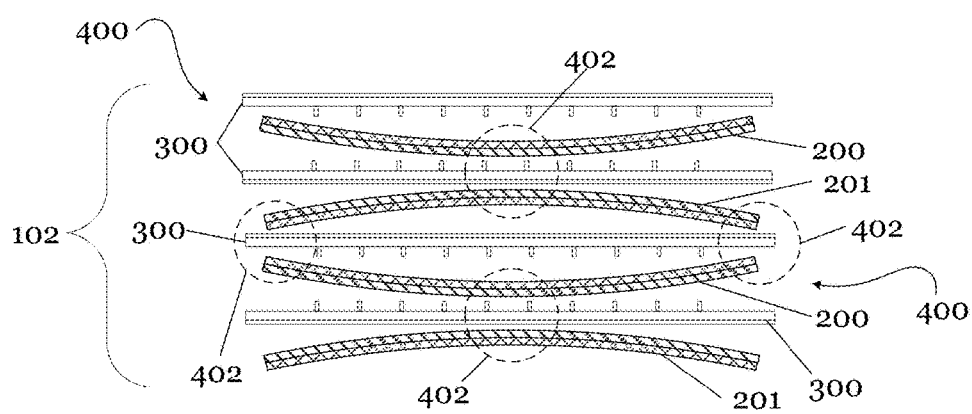
FIG. 5C illustrates adjacent electrode plate and separator assemblies with warped plates and the pinch points they create.

For instance, FIGS. 5A and 5B depict an exemplary warped electrode plate 200, 201. This particular plate 200, 201 is shown warped about a single axis 210, but multi-axes warps can also occur. FIG. 5C is a top-down cross-sectional view of an array 102 of separator/electrode assemblies 400. The array is shown having two positive plates 200, two negative plates 201, and typical commercially known separators 300 that are not designed to accommodate warped plates enveloping the positive plates 200. Because the plates 200, 201 are warped and not flat as they are supposed to be, they create pinch points 402 that may cut or wear through the separator 300 for the plates 200, 201 to make contact with one another and short the cell and/or battery in which they are disposed.

The inventors have further noticed that conditions of high grid corrosion and cycling in a partial state of charge tend to also worsen plate warping. Therefore, provisions are made herein for exemplary separators to help mitigate grid corrosion. It is believed that an imperfect distribution of active material on a grid creates a situation of uneven expansion and contraction of the plate during cycling, thus causing the plate to warp.

Separator Description

Exemplary separators may be provided with a web of a porous membrane, such as a microporous membrane having pores less than about 5 μm, preferably less than about 1 μm, a mesoporous membrane, or a macroporous membrane having pores greater than about 1 μm. The porous membrane may preferably have a pore size that is sub-micron up to 100 μm, and in certain embodiments between about 0.1 μm to about 10 μm. Porosity of the separator membrane described herein may be greater than 50% to 60% in certain embodiments. In certain select embodiments, the porous membrane may be flat or possess ribs that extend from a surface thereof.

Exemplary separators 300 may be provided as a flat sheet, a leaf or leaves, a wrap, a sleeve, or as an envelope or pocket separator. Exemplary envelope separators may preferable have the bottom edge 301c folded, creased, sealed, and/or the like, and the lateral edges 301a, 301b may be continuously or intermittently sealed edges. The edges may be bonded or sealed by adhesive, heat, ultrasonic welding, and/or the like, or combinations thereof. An exemplary envelope separator may envelope a positive electrode (i.e., a positive enveloping separator), such that the separator has two interior sides facing the positive electrode and two exterior sides facing adjacent negative electrodes. Alternatively, another exemplary envelope separator may envelope a negative electrode (i.e., a negative enveloping separator), such that the separator has two interior sides facing the negative electrode and two exterior sides facing adjacent positive electrodes. In certain exemplary embodiments, the battery may utilized one of positive enveloping separators, negative enveloping separators, or both.

Certain exemplary separators may be processed to form hybrid envelopes. The hybrid envelope may be provided with one or more slits or openings formed prior to, during, or after folding the separator sheet in half and/or prior to, during, or after bonding or sealing the edges of the separator sheet to form an envelope. The slits or openings may be disposed within any closed edge of a separator such as the sealed edges, but may preferably be disposed within the bottom fold. The top of the separator is typically left open. The length of the openings may be at least $\frac{1}{50}$, $\frac{1}{25}$, $\frac{1}{20}$, $\frac{1}{15}$, $\frac{1}{10}$, $\frac{1}{8}$, $\frac{1}{5}$, $\frac{1}{4}$, or $\frac{1}{3}$ of the length of the entire closed edge. The length of the openings may be $\frac{1}{50}$ to $\frac{1}{3}$, $\frac{1}{25}$ to $\frac{1}{3}$, $\frac{1}{20}$ to $\frac{1}{3}$, $\frac{1}{20}$ to $\frac{1}{4}$, $\frac{1}{15}$ to $\frac{1}{4}$, $\frac{1}{15}$ to $\frac{1}{5}$ or $\frac{1}{10}$ to $\frac{1}{5}$ of the length of the entire closed edge. The hybrid envelope can have 1-5, 1-4, 2-4, 2-3 or 2 openings, which may or may not be equally disposed along the length of the sealed edge. It is preferred that no opening is in the corner of the envelope.

Ribs

As stated hereinabove, exemplary separators 300 may have the first array of ribs 304 adjacent to a positive plate 200, while the second array of ribs 305 are adjacent to a negative plate 201, or vice versa. Furthermore, either array 304, 305 may take a multitude of forms.

For instance, either or both arrays of ribs 304, 305 may be a uniform set, an alternating set, or a mix or combination of solid ribs, discrete broken ribs, continuous ribs, discontinuous ribs, discontinuous peaks, discontinuous protrusions, angled ribs, diagonal ribs, linear ribs, ribs that are longitudinally extending substantially in a machine direction md of the separator (i.e., running from top to bottom of the separator 300 in the battery 100 (see FIG. 1A)), ribs that are laterally extending substantially in a cross-machine direction emd of the separator (i.e., in a lateral direction of the separator 300 in the battery 100 (see FIG. 1A), orthogonal to the machine direction md), ribs that are transversely extending substantially in said cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, embossed ribs, dimples, columns, mini columns, porous, non-porous, cross ribs, mini ribs, cross-mini ribs, and any combination thereof.

Furthermore, the ribs 304, 305 may be a plurality of ribs, preferably broken ribs, defined by an angle that is neither parallel nor orthogonal relative to an edge of separator. In other words, that angle may be defined as relative to a machine direction of the separator between greater than zero degrees (0°) and less than 180 degrees (180°) or greater than 180 degrees (180°) and less than 360 degrees (360°). In addition, that angle may be defined as relative to a cross-machine direction of the separator between greater than zero degrees (0°) and less than 180 degrees (180°) or greater than 180 degrees (180°) and less than 360 degrees (360°). The angled rib pattern may be a possibly preferred Daramic® RipTide™ acid mixing rib profile that can help reduce, mitigate, or eliminate acid stratification in certain batteries. Select mixing rib profiles tend to show the best efficacy when the exemplary battery is in motion, preferably stop and start motion, and the porous membrane 302 is substantially aligned and parallel with the vector of motion.

In certain exemplary embodiments the ribs 304 of FIG. 1B may face a positive plate when disposed within an exemplary battery, and as such be referred to as positive ribs 304. While the ribs 305 of FIG. 1C may face a negative plate when disposed within an exemplary battery, and as such be referred to as negative ribs 305.

In select exemplary embodiments, at least a portion of the negative ribs may preferably have a height of approximately 5% to approximately 100%, or even greater than 100% of the height of the positive ribs. In some exemplary embodiments, the negative rib height may be at least approximately 5%, 10%, 15%, 20%, 25%, 30%, 35%, 40%, 45%, 50%, 55%, 60%, 65%, 70%, 75%, 80%, 95%, or 100% compared to the positive rib height. In other exemplary embodiments, the negative rib height may no greater than approximately 100%, 95%, 90%, 85%, 80%, 75%, 70%, 65%, 60%, 55%, 50%, 45%, 40%, 35%, 30%, 25%, 20%, 15%, 10%, or 5% compared to the positive rib height.

In some select embodiments, at least a portion of the porous membrane may have negative ribs that are longitudinal, transverse, or cross-ribs. The negative ribs may be parallel to the cross-machine direction cmd of the separator, or may be disposed at an angle thereto. For instance, the negative ribs may be oriented approximately 0°, 5°, 15°, 25°, 30°, 45°, 60°, 70°, 80°, or 90° relative to the cross-machine direction cmd. The cross-ribs may be oriented approximately 0° to approximately 30°, approximately 30° to approximately 45°, approximately 45° to approximately 60°, approximately 30° to approximately 60°, approximately 30° to approximately 90°, or approximately 60° to approximately 90° relative to the cross-machine direction cmd.

As shown in FIGS. 1B and 1C, either array 304, 305 may extend uniformly across the width of the separator 300, from a first lateral edge 301*a* to a second lateral edge 301*b*. This is known as a universal profile.

Figure 6A:
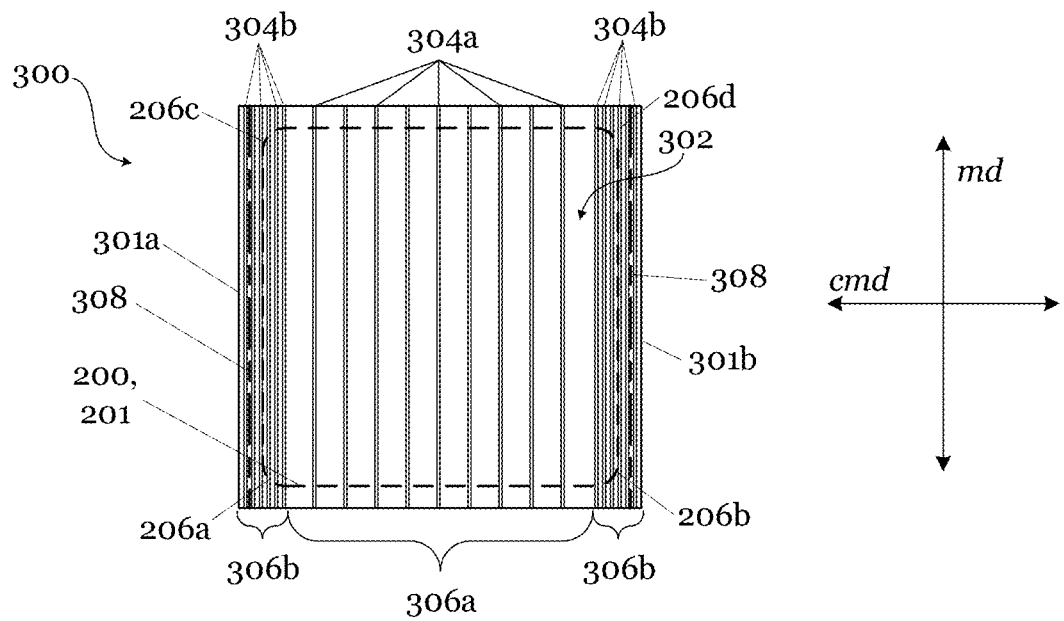
FIGS. 6A and 6B illustrate various exemplary separators and rib profiles that are resistant to plate warping.
Figure 6B:
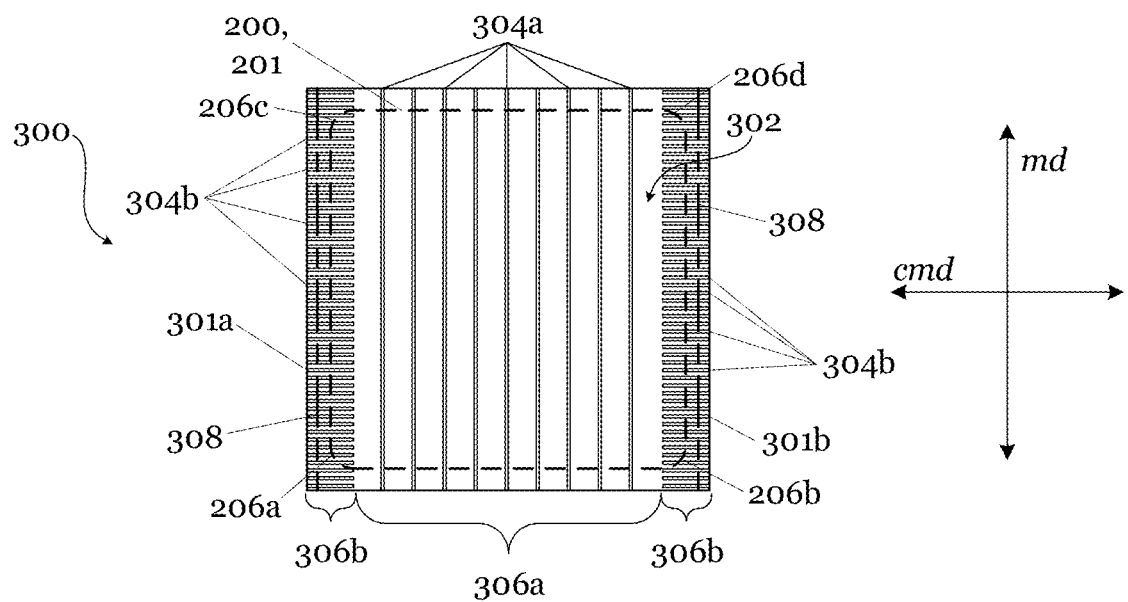

Alternatively and with reference to FIGS. 6A and 6B, exemplary separators of the present disclosure may have a center portion 306*a* and side lanes 306*b* adjacent to the lateral vertical side edges 301*a*, 301*b* with ribs 304*b* disposed therein or no ribs at all, in which the side lanes 306*b* would be flat. The ribs 304*a* in the center portion 306*a* may be called primary ribs and the ribs 304*b* in the side lanes 306*b* may be called secondary ribs. These secondary ribs 304*b* may be more closely spaced than the primary ribs 304*a*, smaller than the primary ribs 304*a*, larger than the primary ribs 304*a*, or a combination thereof. For instance, the secondary ribs 304*b* may be approximately 25% to approximately 100%, or greater than approximately 100% of the height of the primary ribs 304*a*, more closely spaced in comparison to the primary rib 304*a* spacing, or a combination thereof. As additionally shown in FIGS. 6A and 6B, exemplary secondary ribs 304*b* may be longitudinally disposed and aligned with the machine direction md (FIG. 6A), or laterally disposed and aligned with the cross-machine direction cmd (FIG. 6B). Though not shown, exemplary secondary ribs 304*b* may be disposed at an angle relative to the machine direction cmd and cross-machine direction cmd. Exemplary secondary ribs 304*b* may be uniformly disposed at a common angle, or the angle may vary among the secondary ribs 304*b* such as to possibly create a pattern.

As further shown in FIGS. 6A and 6B, an outline of an electrode plate 200, 201 is shown in dashed line to superimpose its position on the separator 300. As can be seen, the plate corners 206*a*, 206*b*, 206*c*, 206*d* are preferably contained, or at least partially contained, within the side lanes 306*b*. As such the secondary ribs 304*b* assist in holding the corners 206*a*, 206*b*, 206*c*, 206*d* in parallel when the plate separator assembly 400 is in compression when disposed within a battery. In addition, the vertical plate edges 204*a*, 204*b* are also preferably contained, or at least partially contained, within the side lanes 306*b*. As such, the secondary ribs 304*b* assist in holding the vertical plate edges 204*a*, 204*b* in parallel when the plate separator assembly 400 is in compression when disposed within a battery. It is additional envisioned that the side lanes 306*b* may have a thicker substrate below the ribs as compared to the substrate in the center portion 306*a*.

The side lanes 306*b* may further assist in sealing an edge of the exemplary separator 300 to another edge of the separator 300 as done when enveloping the separator 300, which is discussed herein. For instance, the seal 308 (as shown in superimposed dashed line) may run through at least a portion of the side lanes 306*b*.

Figure 7A:
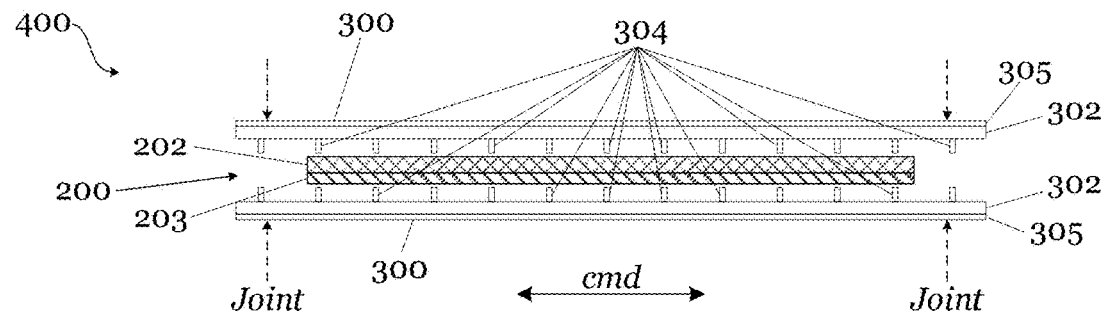
FIGS. 7A-7C show various exemplary electrode plate and separator assemblies with exemplary inventive separators of the present invention.
Figure 7B:
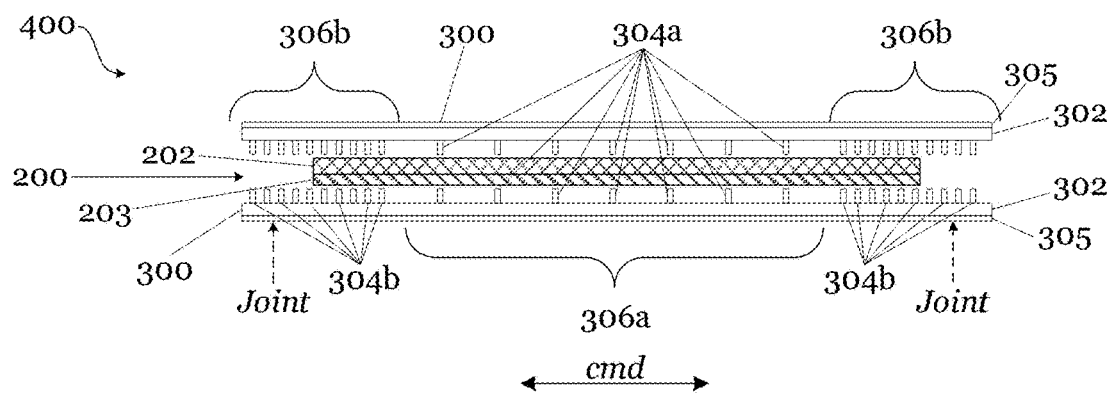
Figure 7C:
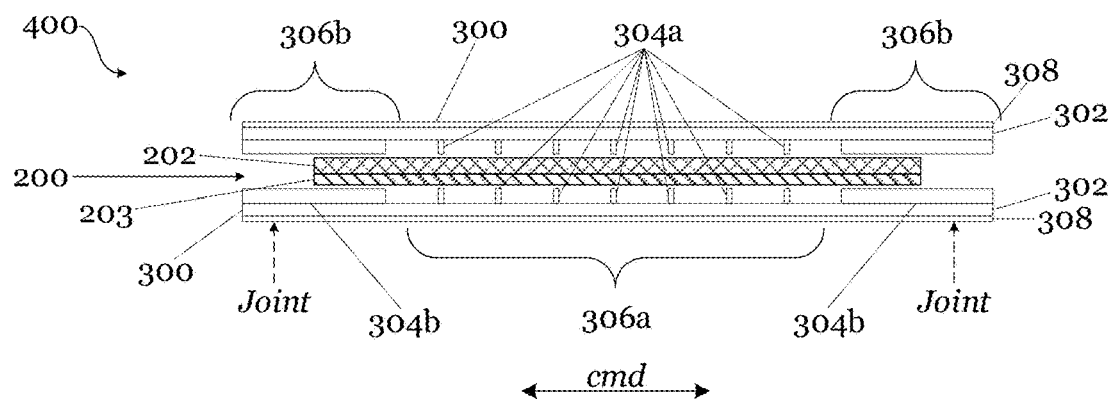

With reference now to FIGS. 7A-7C, exemplary inventive electrode plate and separator assemblies 400 are depicted with various separators 300. As shown, a positive plate 200 is enveloped such that the positive ribs 304, 304*a*, 304*b* are adjacent to the plate 200. Although it is not a shown configuration, it is appreciated that the plate 200 could be a negative plate.

With reference to FIG. 7A, an exemplary plate and separator assembly 400 is provided with a separator 300 with a universal profile. A rib 304 may coincide with the lateral edges of the plate 200. With reference to FIG. 7B, an exemplary plate and separator assembly 400 is provided with a separator with primary ribs 304*a* and secondary ribs 304*b*. The secondary ribs 304*b* are shown running substantially parallel to the machine direction and substantially orthogonal to the cross-machine direction cmd. The lateral edges of the plate 200 are preferably contained, or at least partially contained, within the side lanes 306*b*. With reference to FIG. 7C, an exemplary plate and separator assembly 400 is provided with a separator with primary ribs 304*a* and secondary ribs 304*b*. The secondary ribs 304*b* are shown running substantially parallel to the cross-machine direction cmd and substantially orthogonal to the machine direction. The lateral edges of the plate 200 are preferably contained, or at least partially contained, within the side lanes 306*b*.

As noted in FIGS. 7A-7C, the separators 300 may form an envelope as generally described herein by sealing the separator edges at the line designated as joint.

Particular goals of the present invention include minimizing the effects of negative active material ("NAM") swelling, which tends to lead to acid starvation, while also taking advantage of any motion that the battery may be subject to maximize acid mixing to reduce the effects of acid stratification. Both of these are problems exhibited by batteries operating in a partial state of charge.

The inventors have found that one way to minimize the effects of NAM swelling is to maximize the resiliency of the separator such as to reduce the likelihood that the NAM will deflect the porous backweb into the PAM. A particular method of increasing the separator resiliency is to increase the porous membrane backweb thickness. This however also increases the separator's electrical resistance (to name but one detriment of a thicker backweb) which negatively affects the performance of the battery. The inventors have discovered that increasing the contact points between the separator and the positive electrode acts to stiffen the backweb between contact points. Increasing the number of ribs to achieve this goal also increases the amount of contact area between the separator and positive electrode. Minimizing the contact area is believed to lower the electrical resistance of the separator as well as opening more surface area of the electrodes to the electrolyte for the electrochemical reactions that provide the functionality of the battery. It is also believed that the reduced contact area reduces the opportunities for dendrites to form through the separator and cause an electrical short. The issue of dendrite formation is discussed hereinafter. A further goal is to maximize electrolyte or acid mixing for batteries that are used in motion in order to minimize the effects of acid stratification. Furthermore, solid ribs do not facilitate the goal of acid mixing to reduce acid stratification.

The inventors have found that a separator may be provided with resilient means to resist or mitigate backweb deflection under the forces and pressures exerted by NAM swelling, which leads to acid starvation, by maximizing the number of contact points while simultaneously minimizing the contact area between the separator and the adjacent electrodes as a select exemplary preferred embodiment. The inventors have found another select exemplary embodiment may provide a separator with acid mixing means for reducing, mitigating, or reversing the effects of acid stratification by maximizing the number of discrete contact points between the separator and the adjacent electrodes. Another select exemplary embodiment may provide the separator with dendrite mitigation means to reduce or mitigate lead sulfate ($PbSO_4$) dendrite growth. The inventors have determined that such resilient means, acid mixing means, and dendrite mitigation means may be addressed, achieved, or at least partially addressed and/or achieved by the design of the rib structure. Accordingly, select embodiments described herein rely on rib structure in order to balance these parameters to achieve the desired goals, to provide resilient means, acid mixing means, and dendrite mitigation means, and/or to at least partially address and/or achieve balance of these parameters and/or the desired resilient means, acid mixing means, and/or dendrite mitigation means.

Figure 8A:
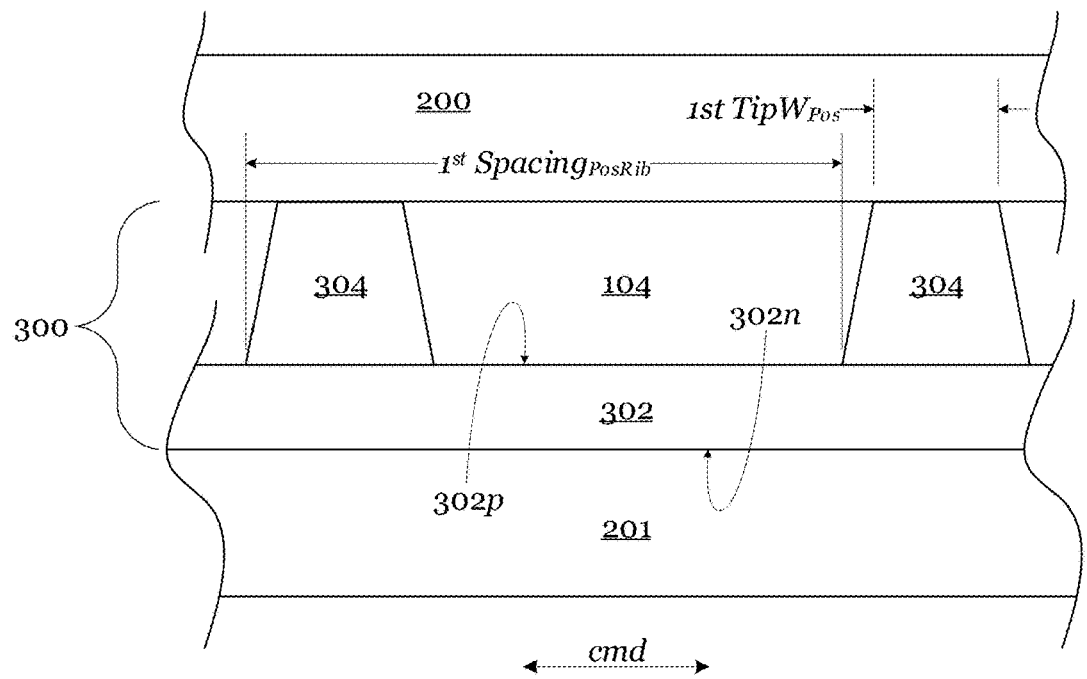
FIGS. 8A and 8B illustrate conventional separators deflected by active material swelling.
Figure 8B:
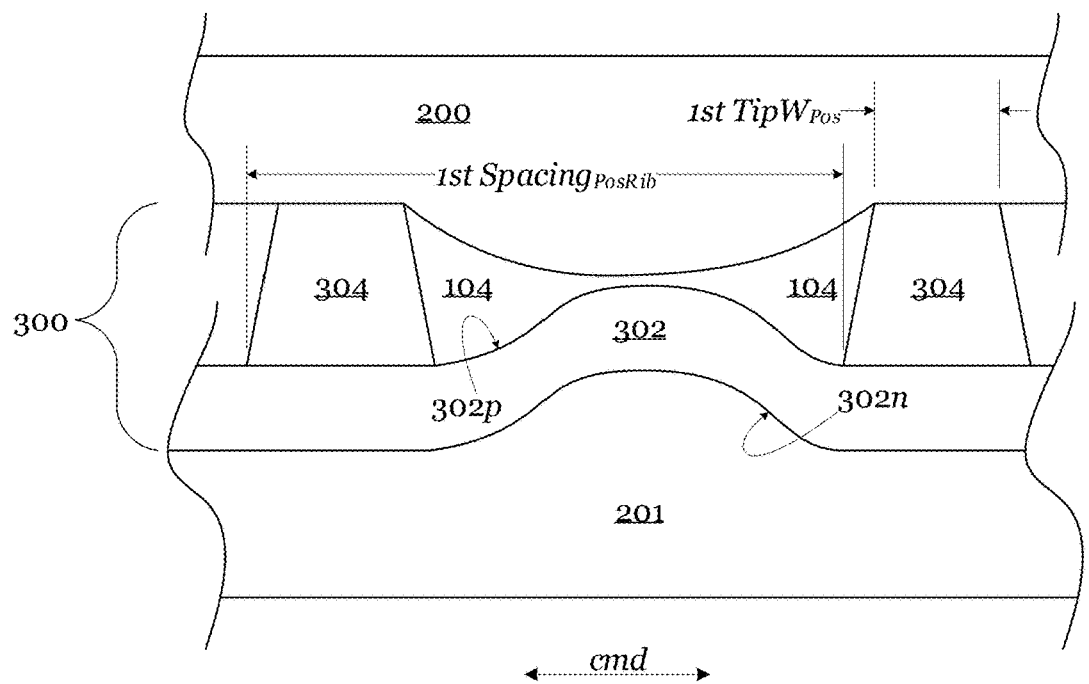

With reference now to FIGS. 8A and 8B, a typical commercially available separator 300 is shown disposed between a positive plate 200 and a negative plate 201, though not shown, the assemblies are assumed to be within a battery and submerged in electrolyte 104. For the sake of simplicity, negative ribs are omitted. FIG. 8A depicts a porous membrane 302 with a positive plate 200 facing side 302p and a negative plate 201 facing side 302n. As shown in FIG. 8B, cycling of the battery causes the active material in the plates 200, 201 to swell and deflect the porous membrane 302 between ribs 304. As shown, the negative active material of the negative plate 201 swells and causes the separator to deflect toward the positive plate 200. At the same time the positive active material of the positive plate 200 swells, and in combination with the negative plate swelling, squeezes a substantial portion of the electrolyte 104 out of the space between electrode plates 200, 201. This condition is known as acid starvation or electrolyte starvation and seriously hinders the life and performance of a lead acid battery.

Figure 8C:
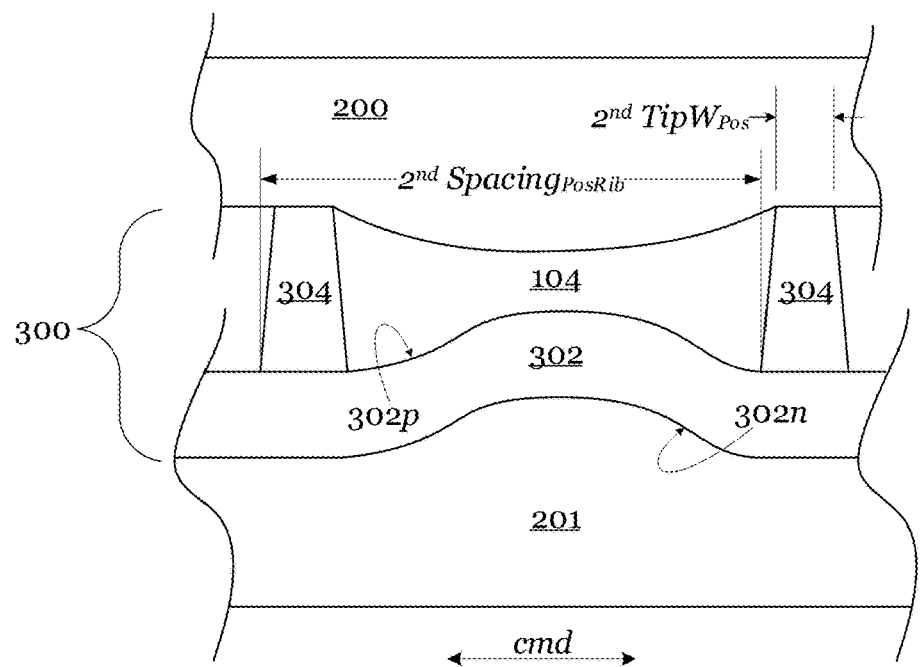
FIGS. 8C and 8D illustrate inventive separators resisting active material swelling.
Figure 8D:
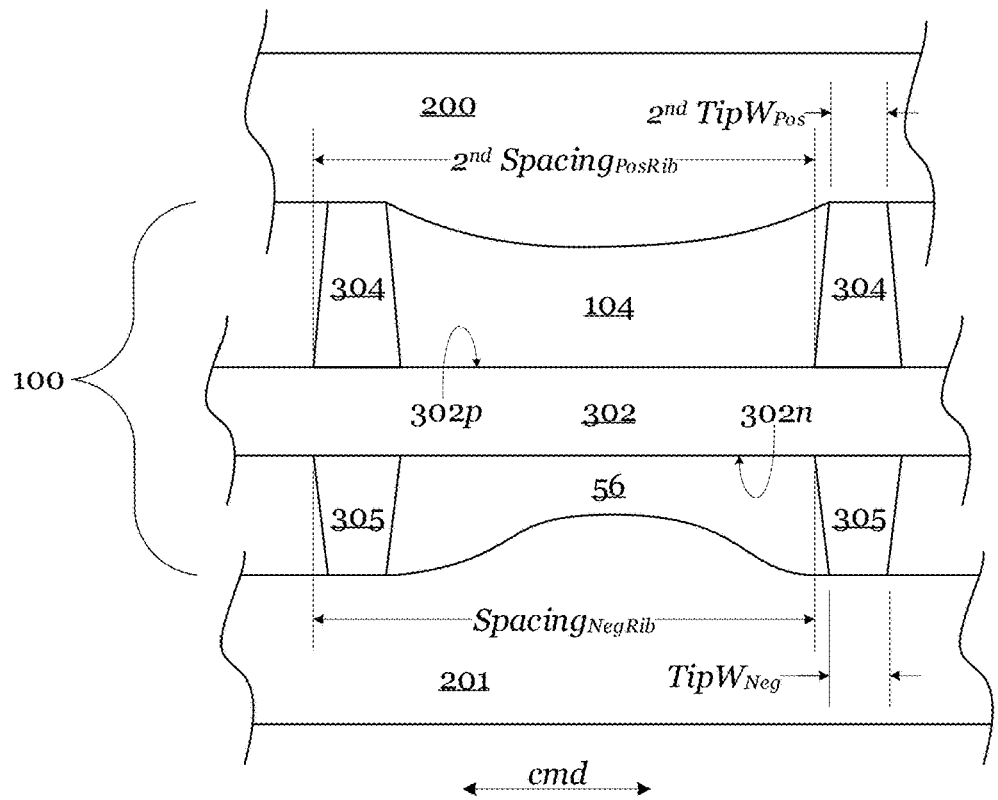

With reference now to FIGS. 8C and 8D, an exemplary improved and inventive separator 300 of the present invention is depicted alleviating the acid starvation typically allowed by previously known battery separator. As shown in FIGS. 8A and 8B, the primary or positive ribs 304 of a typical commercially available separator 300 are shown with a first rib spacing ($1^{st}$ Spacing$_{PosRib}$) as well as a first rib tip width ($1^{st}$ TipW$_{Pos}$). Referring now to the exemplary inventive separator 300 of FIGS. 8C and 8D, the positive ribs 304 are shown having a second rib spacing ($2^{nd}$ Spacing$_{PosRib}$) as well as a second rib tip width ($2^{nd}$ TipW$_{Pos}$). Though not drawn to scale, the second spacing and second tip width are shorter and smaller in dimension than that of the first spacing and first tip width. This maximizes the number of discrete contact points while simultaneously minimizing the contact area between the inventive separator 300 and the adjacent electrodes 200, 201. As can be seen in FIG. 8C, the swollen electrodes 200, 201 are not allowed to deflect the separator squeeze out as much electrolyte between the electrodes as compared to that of a conventional separator shown in FIGS. 8A and 8B. Referring now to FIG. 8D, an inventive separator 300 is shown substantially similar to that of FIG. 8C but with negative ribs 305 that further space the porous membrane 302 from the negative electrode 201. This prevent or at least mitigates the porous membrane 302 from deflecting at all and further mitigates the effects of acid starvation. As describe herein, the ribs 304, 305 may be a variety of heights and widths and do not necessarily depend upon one another. Furthermore, the positive ribs 304 may be spaced at different intervals than that of the negative ribs 305.

Figure 9A:
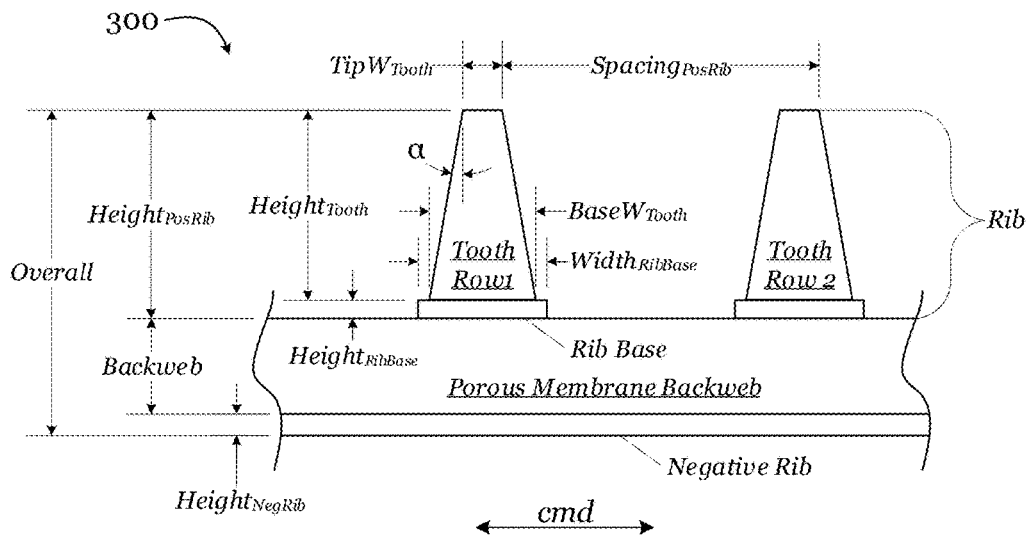
FIGS. 9A and 9B depict exemplary inventive rib profiles of exemplary inventive separators.
Figure 9B:
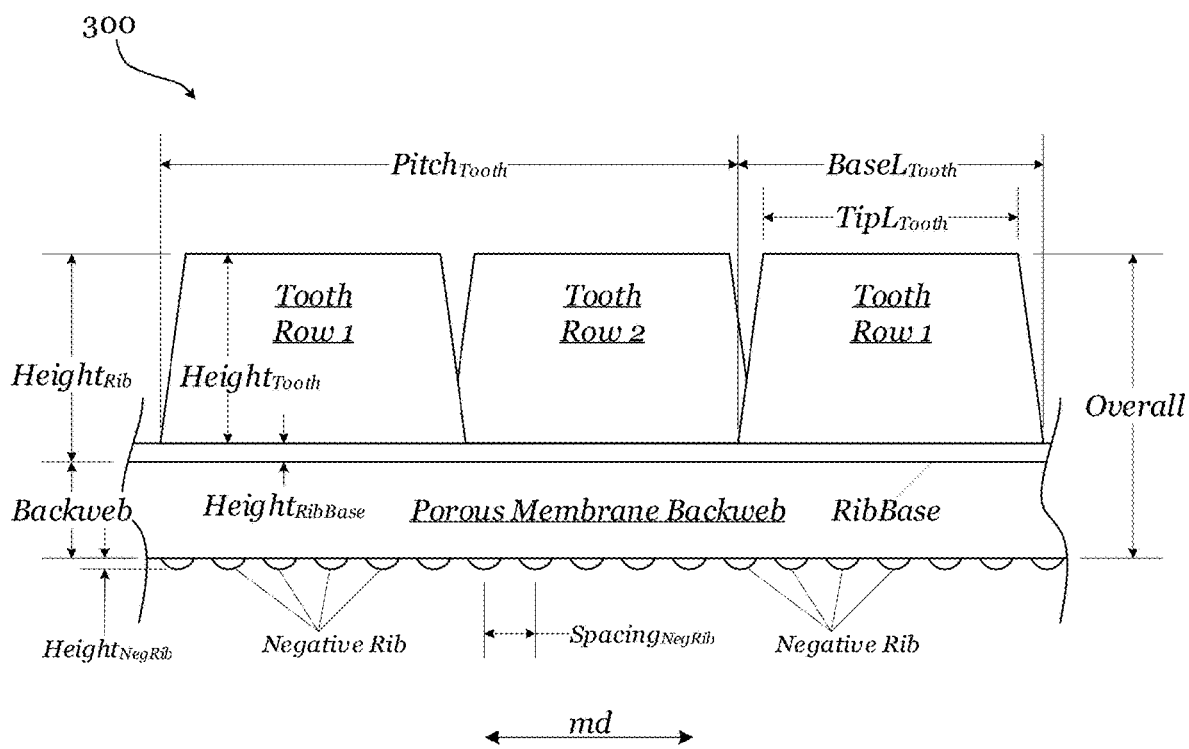

With reference to FIGS. 9A and 9B, certain exemplary embodiments of the inventive separator 300 are provided with an array of positive ribs that may be provided with a rib base (RibBase) extending the length of the separator in the machine direction md. Spaced teeth, discontinuous peaks, or other protrusions (Tooth) may then extend from the surface of rib base, such that the teeth are raised above the underlying surface of the porous membrane backweb (Backweb). Furthermore, the rib base may be wider than the teeth themselves. The positive ribs run substantially parallel to one another at a typical spacing (Spacing$_{PosRib}$) of approximately 2.5 mm to approximately 6.0 mm, with a typical spacing of approximately 3.5 mm. The height of the positive ribs (combined teeth and base portion Height$_{PosRib}$) as measured from the surface of the porous membrane backweb may be approximately 10 μm to approximately 2.0 mm, with a typical height of approximately 0.5 mm. Exemplary rib teeth of ribs in adjacent rows may be substantially in line with one another. However as pictured in FIG. 9B, exemplary teeth in row 1 may be offset from one another from ribs in adjacent row 2, either entirely or partially out of phase from a rib in an adjacent row. As shown, the teeth are entirely out of phase from one row 1 to row 2. The positive rib teeth may be spaced at a pitch (Pitch$_{Tooth}$) in the machine direction md of the separator of approximately 3.0 mm to approximately 6.0 mm, with a typical spacing of approximately 4.5 mm.

With continued reference to FIGS. 9A and 9B, exemplary negative ribs are depicted as being substantially parallel to the cross-machine direction cmd of the separator 300. However, they may alternatively be substantially parallel to a machine direction md. The depicted exemplary negative ribs are shown as being solid and substantially straight. However, they may alternatively be toothed in a generally similar manner as the positive ribs. The negative ribs may be spaced (Spacing$_{NegRib}$) at a distance of approximately 10 µm to approximately 10.0 mm, with a preferred spacing between approximately 700 µm and approximately 800 µm, with a more preferred nominal pitch of approximately 740 µm. The height of the negative ribs (Height$_{NegRib}$) as measured from the surface of the backweb may be approximately 10 µm to approximately 2.0 mm.

It is noted that the positive ribs may alternatively be placed in an exemplary battery such that they contact the negative electrode plate. Likewise, the negative ribs may alternatively be placed in an exemplary battery such that they contact the positive electrode plate. It is further noted that both the positive ribs and/or the negative ribs may be configured like the positive ribs that are shown in FIGS. 9A and 9B. In addition, the positive ribs and negative ribs may both be substantially aligned in the machine direction, the cross-machine direction, or one set in the machine direction and the other set in the cross-machine direction.

Table 1, below, details the rib count and the percentage of surface contact area for four separators (one exemplary inventive separator and three control separators) that are 162 mm by 162 mm (262 cm$^2$). A particular inventive separator is provided with 43 toothed ribs uniformly spaced across the width of the separator in the cross-machine direction. The teeth of the positive ribs on the exemplary inventive separator contacts 3.8% of the 262 cm$^2$ on the positive electrode. The details of the control separators are further detailed in Table 1. It is appreciated that control separators #1, #2, and #3 are typical of commercially available separators presently used flooded lead acid batteries generally and presently available on the market.

TABLE 1

| Separator | Ribs (No. (configuration)) | Contact area (% of total area) |
| --- | --- | --- |
| Inventive Separator | 43 (toothed ribs) | 3.8% |
| Control #1 | 22 (solid ribs) | 4.8% |
| Control #2 | 18 (solid ribs) | 3.9% |
| Control #3 | 11 (solid ribs) | 2.9% |

As stated, the inventors found that maximizing the number of contact points while simultaneously minimizing the contact area achieves the goal of increasing separator resiliency while keeping electrical resistance under control. Furthermore, the toothed design helps facilitate acid mixing by utilizing any motion to which a battery may be subjected. The teeth of the separator ribs may be approximately 2.5 mm to approximately 6.0 mm apart from the closest adjacent tooth. The inventors have found that a preferred, non-limiting, distance is approximately 4.2 mm between adjacent teeth. In addition, the teeth being offset from adjacent rows being completely out of phase helps to facilitate acid mixing. The inventors have also found that the base portion helps to stiffen the backweb enough to provide resilience to the NAM swelling.

Figure 10A:
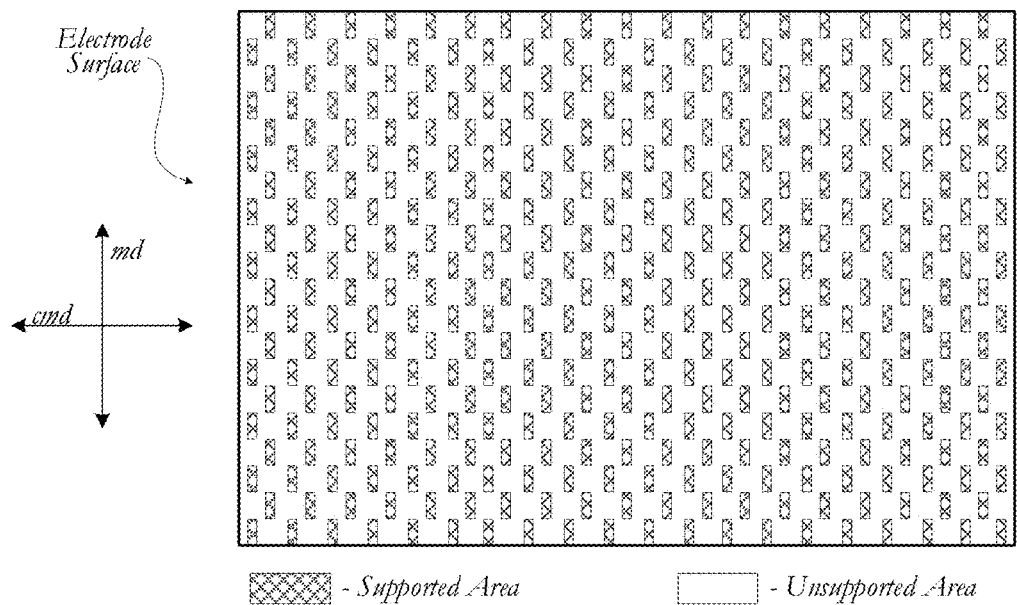
FIGS. 10A and 10B shows an electrode surface and the portions supported by an inventive separator.
Figure 10B:
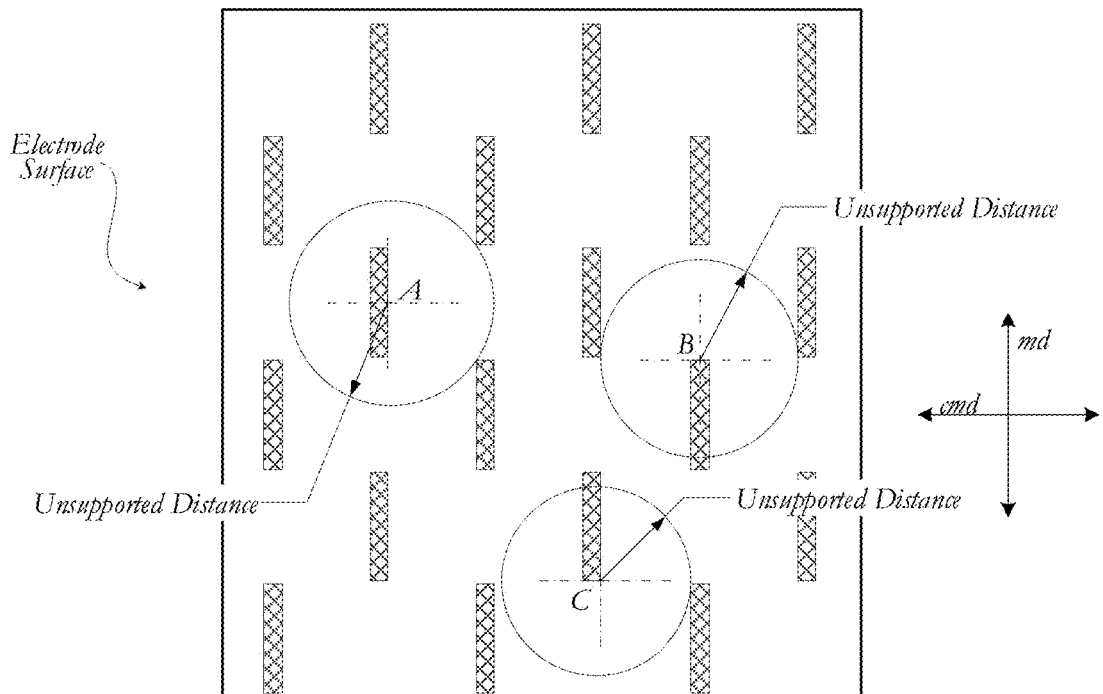

Referring to FIGS. 10A and 10B, an exemplary electrode surface is shown with supported areas and unsupported areas from an inventive separator (not shown). FIG. 10A shows a substantially large portion of the electrode surface, while FIG. 10B shows a close-up detailed view of the same. As can be seen in FIG. 10B, points A, B, and C are shown about various locations on a rib or rib tooth with a radius of an unsupported distance about them (i.e., the distance between one supported location to the nearest adjacent supported location). This unsupported distance may be approximately 2.5 mm to approximately 6.0 mm as described hereinabove.

In certain exemplary embodiments, the positive ribs may possess a base portion (Rib Base in FIGS. 9A and 9B). If present, it may have an average base height of from approximately 5 µm to approximately 200 µm. For example, the average base height may be greater than or equal to approximately 5 µm, 10 µm, 20 µm, 30 µm, 40 µm, 50 µm, 100 µm, or 200 µm. Further, if present it may have an average base width that is from approximately 0.0 µm to approximately 50 µm wider than the tooth width. For example, the average base width may be greater than or equal to approximately 0.0 µm, 5 µm, 10 µm, 20 µm, 30 µm, 40 µm, or 50 µm wider than the tooth width.

In certain exemplary embodiments, the positive ribs may be teeth or toothed ribs. If present, they may have an average tip length TipLTooth of from approximately 50 µm to approximately 1.0 mm. For example, the average tip length may be greater than or equal to approximately 50 µm, 100 µm, 200 µm, 300 µm, 400 µm, 500 µm, 600 µm, 700 µm, 800 µm, 900 µm, or 1.0 mm. Alternatively, they may be no greater than or equal to 1.0 mm, 900 µm, 800 µm, 700 µm, 600 µm, 500 µm, 400 µm, 300 µm, 200 µm, 100 µm, or 50 µm.

In some preferred embodiments, at least a portion of the teeth or toothed ribs may have an average tooth base length BaseL$_{Tooth}$ of from approximately 50 µm to approximately 1.0 mm. For example, the average tooth base length may be approximately 50 µm, 100 µm, 200 µm, 300 µm, 400 µm, 500 µm, 600 µm, 700 µm, 800 µm, 900 µm, or 1.0 mm. Alternatively, they may be no greater than or equal to approximately 1.0 mm, 900 µm, 800 µm, 700 µm, 600 µm, 500 µm, 400 µm, 300 µm, 200 µm, 100 µm, or 50 µm.

In some preferred embodiments, at least a portion of the teeth or toothed ribs may have an average height (combined base portion height and teeth height) Height$_{PosRib}$ of from approximately 50 µm to approximately 1.0 mm. For example, the average height may be approximately 50 µm, 100 µm, 200 µm, 300 µm, 400 µm, 500 µm, 600 µm, 700 µm, 800 µm, 900 µm, or 1.0 mm. Alternatively, they may be no greater than or equal to approximately 1.0 mm, 900 µm, 800 µm, 700 µm, 600 µm, 500 µm, 400 µm, 300 µm, 200 µm, 100 µm, or 50 µm.

In some preferred embodiments, at least a portion of the teeth or toothed ribs may have an average center-to-center pitch within a column in the machine direction of from approximately 100 µm to approximately 50 mm. For example, the average center-to-center pitch may be greater than or equal to approximately 50 µm, 100 µm, 200 µm, 300 µm, 400 µm, 500 µm, 600 µm, 700 µm, 800 µm, 900 µm, or 1.0 mm, and in similar increments up to 50 mm. Alternatively, they may be no greater than or equal to approximately 50 µm, 100 µm, 200 µm, 300 µm, 400 µm, 500 µm, 600 µm, 700 µm, 800 µm, 900 µm, or 1.0 mm, and in similar increments up to 50 mm. In addition, adjacent columns of teeth or toothed ribs may be identically disposed at the same position in a machine direction or offset. In an offset configuration, adjacent teeth or toothed ribs are disposed at different positions in the machine direction.

In some select preferred embodiments, at least a portion of the teeth or toothed ribs may have an average height to base width ratio of from approximately 0.1:1.0 to approximately 500:1.0. For example, the average height to base width ratio may be approximately 0.1:1.0, 25:1.0, 50:1.0, 100:1.0, 150:1.0, 200:1.0, 250:1.0, 300:1.0, 350:1, 450:1.0, or 500:1.0. Alternatively, the average height to base width ratio may be no greater than or equal to approximately 500:1.0, 450:1.0, 400:1.0, 350:1.0, 300:1.0, 250:1.0, 200: 1.0, 150:1.0, 100:1.0, 50:1.0, 25:1.0, or 0.1:1.0.

In some preferred embodiments, at least a portion of the teeth or toothed ribs can have average base width to tip width ratio of from approximately 1,000:1.0 to approximately 0.1:1.0. For example, the average base width to tip width ratio may be approximately 0.1:1.0, 1.0:1.0, 2:1.0, 3:1.0, 4:1.0, 5:1.0, 6:1.0, 7:1.0, 8:1.0, 9:1.0, 10:1.0, 15:1.0, 20:1.0, 25:1.0, 50:1.0, 100:1.0, 150:1.0, 200:1.0, 250:1.0, 300:1.0, 350:1.0, 450:1.0, 500:1.0, 550:1.0, 600:1.0, 650: 1.0, 700:1.0, 750:1.0, 800:1.0, 850:1.0, 900:1.0, 950:1.0, or 1,000:1.0. Alternatively, the average base width to tip width ratio may be no greater than approximately 1,000:1.0, 950: 1.0, 900:1.0, 850:1.0, 800:1.0, 750:1.0, 700:1.0, 650:1.0, 600:1.0, 550:1.0, 500:1.0, 450:1.0, 400:1.0, 350:1.0, 300: 1.0, 250:1.0, 200:1.0, 150:1.0, 100:1.0, 50:1.0, 25:1.0, 20:1.0, 15:1.0, 10:1.0, 9:1.0, 8:1.0, 7:1.0, 6:1.0, 5:1.0, 4:1.0, 3:1.0, 2:1.0, 1.0:1.0, or 0.1:1.0.

Backweb Thickness

In some embodiments, the porous separator membrane can have a backweb thickness from approximately 50 µm to approximately 1.0 mm. for example, the backweb thickness may be may be approximately 50 µm, 100 µm, 200µ, 300 µm, 400 µm, 500 µm, 600 µm, 700 µm, 800 µm, 900 µm, or 1.0 mm. In other exemplary embodiments, the backweb thickness may be no greater than approximately 1.0 mm, 900 µm, 800 µm, 700 µm, 600 µm, 500 µm, 400 µm, 300 µm, 200 µm, 100 µm, or 50 µm. Though in certain embodiments, a very thin flat backweb thickness of 50 µm or thinner is provided, for example, between approximately 10 µm to approximately 50 µm thick.

The total thickness of exemplary separators (backweb thickness and the heights of positive and negative ribs) typically range from approximately 250 µm to approximately 4.0 mm. The total thickness of separators used in automotive start/stop batteries are typically approximately 250 µm to approximately 1.0 mm. The total thickness of separators used in industrial traction-type start/stop batteries are typically approximately 1.0 mm to approximately 4.0 mm.

Composition

In certain exemplary embodiments, the improved separator may include a porous membrane made of: a natural or synthetic base material; a processing plasticizer; a filler; natural or synthetic rubber(s) or latex, and one or more other additives and/or coatings, and/or the like.

Base Materials

In certain embodiments, exemplary natural or synthetic base materials may include: polymers; thermoplastic polymers; phenolic resins; natural or synthetic rubbers; synthetic wood pulp; lignins; glass fibers; synthetic fibers; cellulosic fibers; and any combination thereof. In certain preferable embodiments, an exemplary separator may be a porous membrane made from thermoplastic polymers. Exemplary thermoplastic polymers may, in principle, include all acid-resistant thermoplastic materials suitable for use in lead acid batteries. In certain preferred embodiments, exemplary thermoplastic polymers may include polyvinyls and polyolefins. In certain embodiments, the polyvinyls may include, for example, polyvinyl chloride ("PVC"). In certain preferred embodiments, the polyolefins may include, for example, polyethylene, polypropylene, ethylene-butene copolymer, and any combination thereof, but preferably polyethylene. In certain embodiments, exemplary natural or synthetic rubbers may include, for example, latex, uncross-linked or cross-linked rubbers, crumb or ground rubber, and any combination thereof.

In addition, it has been observed that when antimony (Sb) is present in the NAM and/or negative electrode, NAM swelling is reduced. Accordingly, there may be an antimony coating on the separator or antimony additive in the separator composition.

Polyolefins

In certain embodiments, the porous membrane layer preferably includes a polyolefin, specifically polyethylene. Preferably, the polyethylene is high molecular weight polyethylene ("HMWPE"), (e.g., polyethylene having a molecular weight of at least 600,000). Even more preferably, the polyethylene is ultra-high molecular weight polyethylene ("UHMWPE"). Exemplary UHMWPE may have a molecular weight of at least 1,000,000, in particular more than 4,000,000, and most preferably 5,000,000 to 8,000,000 as measured by viscosimetry and calculated by Margolie's equation. Further, exemplary UHMWPE may possess a standard load melt index of substantially zero (0) as measured as specified in ASTM D 1238 (Condition E) using a standard load of 2, 160 g. Moreover, exemplary UHMWPE may have a viscosity number of not less than 600 ml/g, preferably not less than 1,000 ml/g, more preferably not less than 2,000 ml/g, and most preferably not less than 3,000 ml/g, as determined in a solution of 0.02 g of polyolefin in 100 g of decalin at 130° C.

Rubber

The novel separator disclosed herein may contain latex and/or rubber. As used herein, rubber shall describe, rubber, latex, natural rubber, synthetic rubber, cross-linked or uncross-linked rubbers, cured or uncured rubber, crumb or ground rubber, or mixtures thereof. Exemplary natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbomene rubber, acrylate rubber, fluorine rubber and silicone rubber and copolymer rubbers, such as styrene/butadiene rubbers, acrylonitrile/butadiene rubbers, ethylene/propylene rubbers ("EPM" and "EPDM") and ethylene/vinyl acetate rubbers. The rubber may be a cross-linked rubber or an uncross-linked rubber; in certain preferred embodiments, the rubber is uncross-linked rubber. In certain embodiments, the rubber may be a blend of cross-linked and uncross-linked rubber.

Plasticizer

In certain embodiments, exemplary processing plasticizers may include processing oil, petroleum oil, paraffin-based mineral oil, mineral oil, and any combination thereof.

Fillers

The separator can contain a filler having a high structural morphology. Exemplary fillers can include: silica, dry finely divided silica; precipitated silica; amorphous silica; highly friable silica; alumina; talc; fish meal; fish bone meal; carbon; carbon black; and the like, and combinations thereof. In certain preferred embodiments, the filler is one or more silicas. High structural morphology refers to increased surface area. The filler can have a high surface area, for instance, greater than 100 m2/g, 110 m2/g, 120 m2/g, 130 m2/g, 140 m2/g, 150 m2/g, 160 m2/g, 170 m2/g, 180 m2/g, 190 m2/g, 200 m2/g, 210 m2/g, 220 m2/g, 230 m2/g, 240 m2/g, or 250 m2/g. In some embodiments, the filler (e.g., silica) can have a surface area from 100-300 m2/g, 125-275 m2/g, 150-250 m2/g, or preferably 170-220 m2/g. Surface area can be assessed using TriStar 3000™ for multipoint BET nitrogen surface area. High structural morphology permits the filler to hold more oil during the manufacturing process. For instance, a filler with high structural morphology has a high level of oil absorption, for instance, greater than about 150 ml/100 g, 175 ml/100 g, 200 ml/100 g, 225 ml/100 g, 250 ml/100 g. 275 ml/100 g, 300 ml/100 g, 325 ml/100 g, or 350 ml/100 g. In some embodiments the filler (e.g., silica) can have an oil absorption from 200-500 ml/100 g, 200-400 ml/100 g, 225-375 ml/100 g, 225-350 ml/100 g, 225-325 ml/100 g, preferably 250-300 ml/100 g. In some instances, a silica filler is used having an oil absorption of 266 ml/100 g. Such a silica filler has a moisture content of 5.1%, a BET surface area of 178 m2/g, an average particle size of 23 μm, a sieve residue 230 mesh value of 0.1%, and a bulk density of 135 g/L.

Silica with relatively high levels of oil absorption and relatively high levels of affinity for the plasticizer (e.g., mineral oil) becomes desirably dispersible in the mixture of polyolefin (e.g., polyethylene) and the plasticizer when forming an exemplary lead acid battery separator of the type shown herein. In the past, some separators have experienced the detriment of poor dispersibility caused by silica aggregation when large amounts of silica are used to make such separators or membranes. In at least certain of the inventive separators shown and described herein, the polyolefin, such as polyethylene, forms a shish-kebab structure, since there are few silica aggregations or agglomerates that inhibit the molecular motion of the polyolefin at the time of cooling the molten polyolefin. All of this contributes to improved ion permeability through the resulting separator membrane, and the formation of the shish-kebab structure or morphology means that mechanical strength is maintained or even improved while a lower overall ER separator is produced.

In some select embodiments, the filler (e.g., silica) has an average particle size no greater than 25 μm, in some instances, no greater than 22 μm, 20 μm, 18 μm, 15 μm, or 10 μm. In some instances, the average particle size of the filler particles is 15-25 μm. The particle size of the silica filler and/or the surface area of the silica filler contributes to the oil absorption of the silica filler. Silica particles in the final product or separator may fall within the sizes described above. However, the initial silica used as raw material may come as one or more agglomerates and/or aggregates and may have sizes around 200 μm or more.

In some preferred embodiments, the silica used to make the inventive separators has an increased amount of or number of surface silanol groups (surface hydroxyl groups) compared with silica fillers used previously to make lead acid battery separators. For example, the silica fillers that may be used with certain preferred embodiments herein may be those silica fillers having at least 10%, at least 15%, at least 20%, at least 25%, at least 30%, or at least 35% more silanol and/or hydroxyl surface groups compared with known silica fillers used to make known polyolefin lead acid battery separators.

The ratio (Si—OH)/Si of silanol groups (Si—OH) to elemental silicon (Si) can be measured, for example, as follows.

1. Freeze-crush a polyolefin porous membrane (where certain inventive membranes contain a certain variety of oil-absorbing silica according to the present invention), and prepare the powder-like sample for the solid-state nuclear magnetic resonance spectroscopy ($^{29}$Si-NMR).

2. Perform the $^{29}$Si-NMR to the powder-like sample, and observe the spectrums including the Si spectrum strength which is directly bonding to a hydroxyl group (Spectrum: $Q_2$ and $Q_3$) and the Si spectrum strength which is only directly bonding to an oxygen atom (Spectrum: $Q_4$), wherein the molecular structure of each NMR peak spectrum can be delineated as follows:

$Q_2$: $(SiO)_2$—Si*—$(OH)_2$: having two hydroxyl groups
$Q_3$: $(SiO)_3$—Si*—(OH): having one hydroxyl group
$Q_4$: $(SiO)_4$—Si*: All Si bondings are SiO
Where Si* is proved element by NMR observation.

3. The conditions for $^{29}$Si-NMR used for observation are as follows:
Instrument: Bruker BioSpin Avance 500
Resonance Frequency: 99.36 MHz
Sample amount: 250 mg
NMR Tube: 7 mφ
Observing Method: DD/MAS
Pulse Width: 45°
Repetition time: 100 sec
Scans: 800
Magic Angle Spinning: 5,000 Hz
Chemical Shift Reference: Silicone Rubber as −22.43 ppm 4. Numerically, separate peaks of the spectrum, and calculate the area ratio of each peak belonging to $Q_2$, $Q_3$, and $Q_4$. After that, based on the ratios, calculate the molar ratio of hydroxyl groups (—OH) bonding directly to Si. The conditions for the numerical peak separation is conducted in the following manner:
Fitting region: −80 to −130 ppm
Initial peak top: −93 ppm for $Q_2$, −101 ppm for $Q_3$, −111 ppm for $Q_4$, respectively.
Initial full width half maximum: 400 Hz for $Q_2$, 350 Hz for $Q_3$, 450 Hz for $Q_4$, respectively.
Gaussian function ratio: 80% at initial and 70 to 100% while fitting.

5. The peak area ratios (Total is 100) of $Q_2$, $Q_3$, and $Q_4$ are calculated based on the each peak obtained by fitting. The NMR peak area corresponded to the molecular number of each silicate bonding structure (thus, for the $Q_4$ NMR peak, four Si—O—Si bonds are present within that silicate structure; for the Q: NMR peak, three Si—O—Si bonds are present within that silicate structure while one Si—OH bond is present; and for the $Q_2$ NMR peak, two Si—O—Si bonds are present within that silicate structure while two Si—OH bonds are present). Therefore each number of the hydroxyl group (—OH) of $Q_2$, $Q_3$, and $Q_4$ is multiplied by two (2) one (1), and zero (0), respectively. These three results are summed. The summed value displays the mole ratio of hydroxyl groups (—OH) directly bonding to Si.

In certain embodiments, the silica may have a molecular ratio of OH to Si groups, measured by $^{29}$Si-NMR, that may be within a range of approximately 21:100 to 35:100, in some preferred embodiments approximately 23:100 to approximately 31:100, in certain preferred embodiments, approximately 25:100 to approximately 29:100, and in other preferred embodiments at least approximately 27:100 or greater.

In some select embodiments, use of the fillers described above permits the use of a greater proportion of processing oil during the extrusion step. As the porous structure in the separator is formed, in part, by removal of the oil after the extrusion, higher initial absorbed amounts of oil results in higher porosity or higher void volume. While processing oil is an integral component of the extrusion step, oil is a non-conducting component of the separator. Residual oil in the separator protects the separator from oxidation when in contact with the positive electrode. The precise amount of oil in the processing step may be controlled in the manufacture of conventional separators. Generally speaking, conventional separators are manufactured using 50-70% processing oil, in some embodiments, 55-65%, in some embodiments, 60-65%, and in some embodiments, about 62% by weight processing oil. Reducing oil below about 59% is known to cause burning due to increased friction against the extruder components. However, increasing oil much above the prescribed amount may cause shrinking during the drying stage, leading to dimensional instability. Although previous attempts to increase oil content resulted in pore shrinkage or condensation during the oil removal, separators prepared as disclosed herein exhibit minimal, if any, shrinkage and condensation during oil removal. Thus, porosity can be increased without compromising pore size and dimensional stability, thereby decreasing electrical resistance.

In certain select embodiments, the use of the filler described above allows for a reduced final oil concentration in the finished separator. Since oil is a non-conductor, reducing oil content can increase the ionic conductivity of the separator and assist in lowering the ER of the separator. As such, separators having reduced final oil contents can have increased efficiency. In certain select embodiments are provided separators having a final processing oil content (by weight) less than 20%, for example, between about 14% and 20%, and in some particular embodiments, less than 19%, 18%, 17%, 16%, 15%, 14%, 13%, 12%, 11%, 10%, 9%, 8%, 7%, 6%, or 5%.

The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (e.g., polar species, such as metals) that facilitate the flow of electrolyte and ions across the separator. Such also leads to decreased overall electrical resistance as such a separator is used in a flooded battery, such as an enhanced flooded battery.

Friability

In certain select embodiments, the filler can be an alumina, talc, silica, or a combination thereof. In some embodiments, the filler can be a precipitated silica, and in some embodiments, the precipitated silica is amorphous silica. In some embodiments, it is preferred to use aggregates and/or agglomerates of silica which allow for a fine dispersion of filler throughout the separator, thereby decreasing tortuosity and electrical resistance. In certain preferred embodiments, the filler (e.g., silica) is characterized by a high level of friability. Good friability enhances the dispersion of the filler throughout the polymer during extrusion of the porous membrane, enhancing porosity and thus overall ionic conductivity through the separator.

Figure 11:
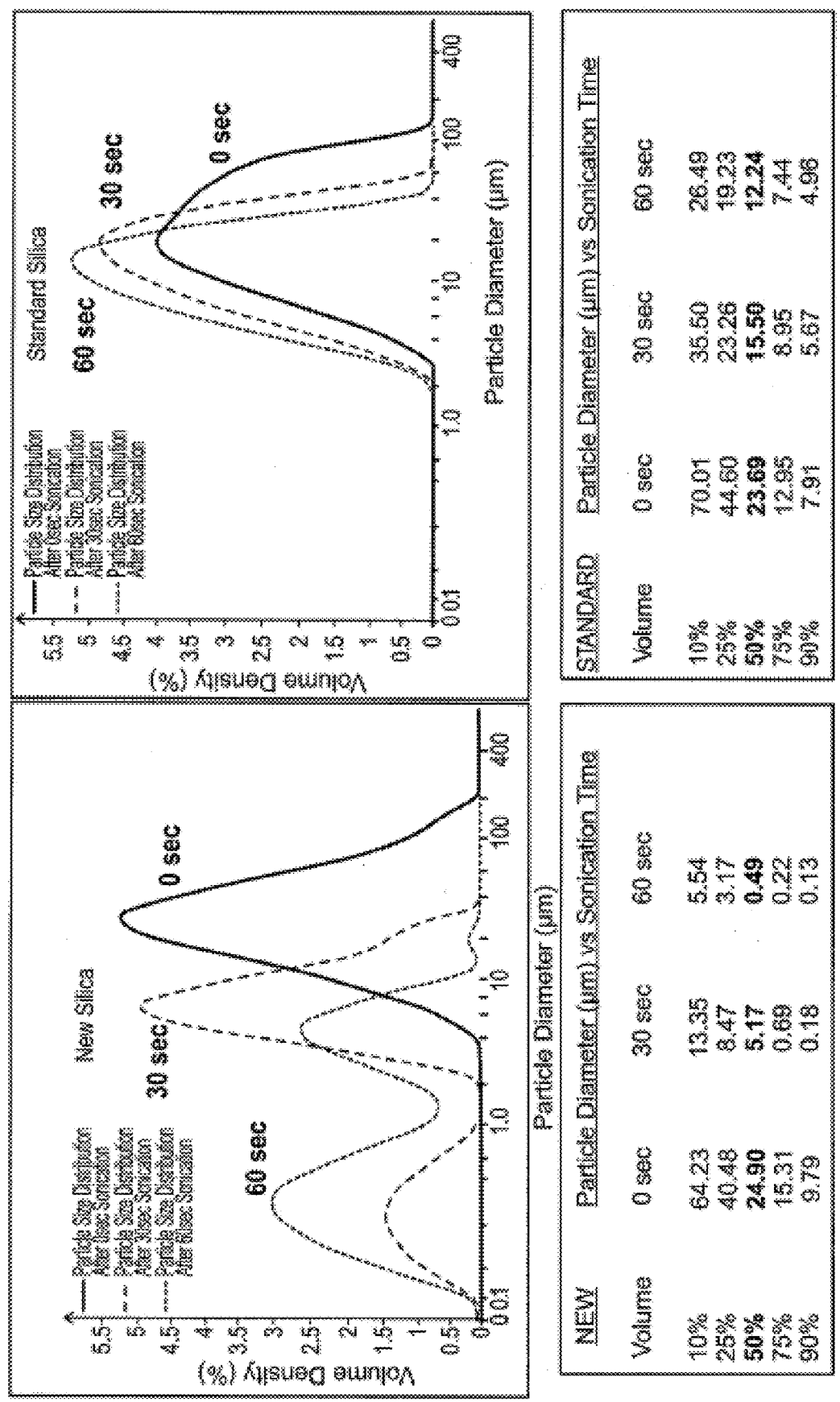
FIG. 11 is a graph and chart depicting the friability properties of an inventive silica.

Friability may be measured as the ability, tendency, or propensity of the silica particles or material (aggregates or agglomerates) to be broken down into smaller sized and more dispersible particles, pieces or components. A new inventive silica is more friable (is broken down into smaller pieces after 30 seconds and after 60 seconds of sonication) than standard silica. For example and as shown in FIG. 11, a new inventive silica may have a 50% volume particle diameter of 24.90 µm at 0 seconds sonication, 5.17 µm at 30 seconds and 0.49 µm at 60 seconds. Hence, at 30 seconds sonication there was over a 50% reduction in size (diameter) and at 60 seconds there was over a 75% reduction in size (diameter) of the 50% volume silica particles. Hence, one possibly preferred definition of "high friability" may be at least a 50% reduction in average size (diameter) at 30 seconds of sonication and at least a 75% reduction in average size (diameter) at 60 seconds of sonication of the silica particles (or in processing of the resin silica mix to form the membrane). In at least certain embodiments, it may be preferred to use a more friable silica, and may be even more preferred to use a silica that is friable and multi-modal, such as bi-modal or tri-modal, in its friability. For example, a traditional standard silica may appear to be single modal in its friability or particle size distribution, while a new inventive silica appears more friable, and bi-modal (two peaks) at 30 seconds sonication and tri-modal (three peaks) at 60 seconds sonication. Such friable and multi-modal particle size silica or silicas may provide enhanced membrane and separator properties.

The use of a filler having one or more of the above characteristics enables the production of a separator having a higher final porosity. The separators disclosed herein can have a final porosity greater than 60%, 61%, 62%, 63%, 64%, 65%, 66%, 67%, 68%, 69%, or 70%. Porosity may be measured using gas adsorption methods. Porosity can be measured by BS-TE-2060.

In some select embodiments, the porous separator can have a greater proportion of larger pores while maintaining the average pore size no greater than about 1 µm, 0.9 µm, 0.8 µm, 0.7 µm, 0.6 µm, 0.5 µm, or 0.1 µm.

In accordance with at least one embodiment, the separator is made up of polyethylene, such as an ultrahigh molecular weight polyethylene ("UHMWPE"), mixed with a processing oil and filler as well as any desired additive. In accordance with at least one other embodiment, the separator is made up of an ultrahigh molecular weight polyethylene (UHMWPE) mixed with a processing oil and talc. In accordance with at least one other embodiment, the separator is made up of UHMWPE mixed with a processing oil and silica, for instance, precipitated silica, for instance, amorphous precipitated silica. The additive can then be applied to the separator via one or more of the techniques described above.

Besides reducing electrical resistance and increasing cold cranking amps, preferred separators are also designed to bring other benefits. With regard to assembly, the separators are more easily passed through processing equipment, and therefore more efficiently manufactured. To prevent shorts during high speed assembly and later in life, the separators have superior puncture strength and oxidation resistance when compared to standard PE separators. Combined with reduced electrical resistance and increased cold cranking amps, battery manufacturers are likely to find improved and sustained electrical performance in their batteries with these new separators.

Conductive Layer

In certain embodiments, a separator may contain a performance-enhancing additive in the form of a nucleation additive and/or coating. The nucleation additive may preferably be stable in the battery electrolyte, and may further be dispersed within the electrolyte.

The inventors hypothesize that, upon charging the battery, smaller lead sulfate crystals return to solution more readily as compared to larger crystals. It is believed that providing nucleation sites give the crystals a starting point of formation. Furthermore, many nucleation sites may provide many places for crystals to form, and thus spread out the total amount of lead sulfate into a large number of smaller crystals as opposed to a smaller number of larger crystals.

These smaller crystals will then more easily go back into solution during a charging cycle of the battery and therefore hinder the growth of dendrites. The inventors have identified various nucleation additives for the separator, such as carbon and barium sulfate ($BaSO_4$), as exemplary means to provide these nucleation sites. In addition to providing nucleation sites, the carbon may also increase the battery charge acceptance and increase battery capacity.

Another benefit that the carbon provides is increased charge acceptance. One hypothesis of the inventors' poses that highly conductive carbon particles provide an electronically conductive pathway to the active material and therefore improving the active material utilization. Another hypothesis of the inventors' is that the carbon increases the capacitance of the separator and thus the entire battery system.

Exemplary forms of nucleation additives and/or coatings may be or contain carbon, such as carbon, conductive carbon, graphite, artificial graphite, activated carbon, carbon paper, acetylene black, carbon black, high surface area carbon black, graphene, high surface area graphene, keitjen black, carbon fibers, carbon filaments, carbon nanotubes, open-cell carbon foam, a carbon mat, carbon felt, carbon Buckminsterfullerene (Bucky Balls), an aqueous carbon suspension, and combinations thereof. In addition to these many forms of carbon, the nucleation additive and/or coating may also include or contain barium sulfate ($BaSO_4$) either alone or in combination with carbon.

The nucleation coating may be applied to a finished separator by such means as a slurry coating, slot die coating, spray coating, curtain coating, ink jet printing, screen printing, or by vacuum deposition or chemical vapor deposition ("CVD"). In addition, the additive and/or coating may be provided as carbon paper, either woven or nonwoven, and disposed between and in intimate contact with the separator and electrode(s).

The nucleation additive and/or coating may be within the separator, or on one or both electrode facing surfaces of the separator. Typically, a coating or layer of the nucleation additive may only be on the negative electrode facing surface. However, it may be on the positive electrode facing surface, or on both surfaces.

In certain embodiments, the nucleation additive may be added to the extrusion mix of base materials and extruded with the separator, or co-extruded as a layer on the separator. When included in the extrusion mix, the nucleation additive may replace some of the silica filler by as much as 5% to 75% by weight. For example, the nucleation additive may be approximately 5%, 10%, 15%, 20%, 25%, 30%, 35%, 40%, 45%, 50%, 55%, 60%, 65%, 70%, or approximately 75% by weight. In other exemplary embodiments, the nucleation additive may be no greater than approximately 75%, 70%, 65%, 60%, 55%, 50%, 45%, 40%, 35%, 30%, 25%, 20%, 15%, 10%, or approximately 5% weight.

A conductive layer may be disposed on an exemplary battery separator. The conductive layer may preferably be adapted to be in contact with a positive electrode of battery. The conductive layer may be for providing a new route of current to and from positive electrode. The conductive layer may be made of any conductive material, including, but not limited to, alumina, lead, gold, antimony, arsenic, zinc, barium, beryllium, lithium, magnesium, nickel, aluminum, silver, tin, and combination alloys thereof, or carbon fibers, graphite, carbon, carbon and zinc, carbon nanotubes, Buckminsterfullerene (or bucky-balls), and combinations thereof. The carbon nanotubes or bucky-balls might be dispersed in a medium with a binder and painted on battery separator.

The conductive layer may be made of any conductive material that is more corrosion resistant than the positive electrode conductor, therefore allowing the conductive layer to function as the positive electrode conductor when the conductive capability of the positive electrode conductor deteriorates. The conductive layer may be a lead based alloy with 0.8% to 1.17% tin, and greater than zero (0) to 0.015% silver. The conductive layer may be a lead-based alloy with 0.02% to 0.06% calcium, 0.3% to 3% tin, and 0.01% to 0.05% silver. The conductive layer may be made into any form, including but not limited to, a strip, a screen, a foil, a thread, a wire, a coating, etc., or combinations thereof. The conductive layer may be any thickness, for example, a thickness of approximately 3 µm. The conductive layer may be disposed upon the battery separator by any means, including, but not limited to, adhesives, hot melting, painting, etc. The conductive layer may be as described in U.S. Pat. No. 9,564,623, which is incorporated herein by reference in its entirety.

Electrical Resistance

In certain selected embodiments, the disclosed separators exhibit decreased electrical resistance, for instance, an electrical resistance no greater than about 200 $m\Omega \cdot cm^2$, 180 $m\Omega \cdot cm^2$, 160 $m\Omega \cdot cm^2$, 140 $m\Omega \cdot cm^2$, 120 $m\Omega \cdot cm^2$, 100 $m\Omega \cdot cm^2$, 80 $m\Omega \cdot cm^2$, 60 $m\Omega \cdot cm^2$, 50 $m\Omega \cdot cm^3$, 40 $m\Omega \cdot cm^2$, 30 $m\Omega \cdot cm^2$, or 20 $m\Omega \cdot cm^2$. In various embodiments, the separators described herein exhibit about a 20% or more reduction in ER compared with a known separator of the same thickness. For example, a known separator may have an ER value of 60 $m\Omega \cdot cm^2$; thus, a separator according to the present invention at the same thickness would have an ER value of less than about 48 $m\Omega \cdot cm^2$.

To test a sample separator for ER testing evaluation in accordance with the present invention, it must first be prepared. To do so, a sample separator is preferably submerged in a bath of demineralized water, the water is then brought to a boil and the separator is then removed after 10 minutes in the boiling demineralized water bath. After removal, excess water is shaken off the separator and then placed in a bath of sulfuric acid having a specific gravity of 1.280 at 27° C.±1° C. The separator is soaked in the sulfuric acid bath for 20 minutes. The separator is then ready to be tested for electrical resistance.

Oxidation Stability

In certain selected embodiments, exemplary separators may be characterized with an improved and higher oxidation resistance. Oxidation resistance is measured in elongation of sample separator specimens in the cross-machine direction after prolonged exposure to the environment within a lead acid battery, including the acidic electrolyte and temperature fluctuations. For instance, exemplary separators may have an elongation at 40 hours of approximately 100% or higher, 150% or higher, 200% or higher, 250% or higher, 300% or higher, 350% or higher, 400% or higher, 450% or higher, or 500% or higher. In certain embodiments, exemplary separators may have a preferred oxidation resistance or elongation at 40 hours of approximately 100% or higher. In addition, exemplary separators may have an elongation at 20 hours of approximately 200% or higher, 250% or higher, 300% or higher, 350% or higher, 400% or higher, 450% or higher, or 500% or higher. In certain embodiments, exemplary separators may have a preferred oxidation resistance or elongation at 20 hours of approximately 200% or higher.

Figure 12A:
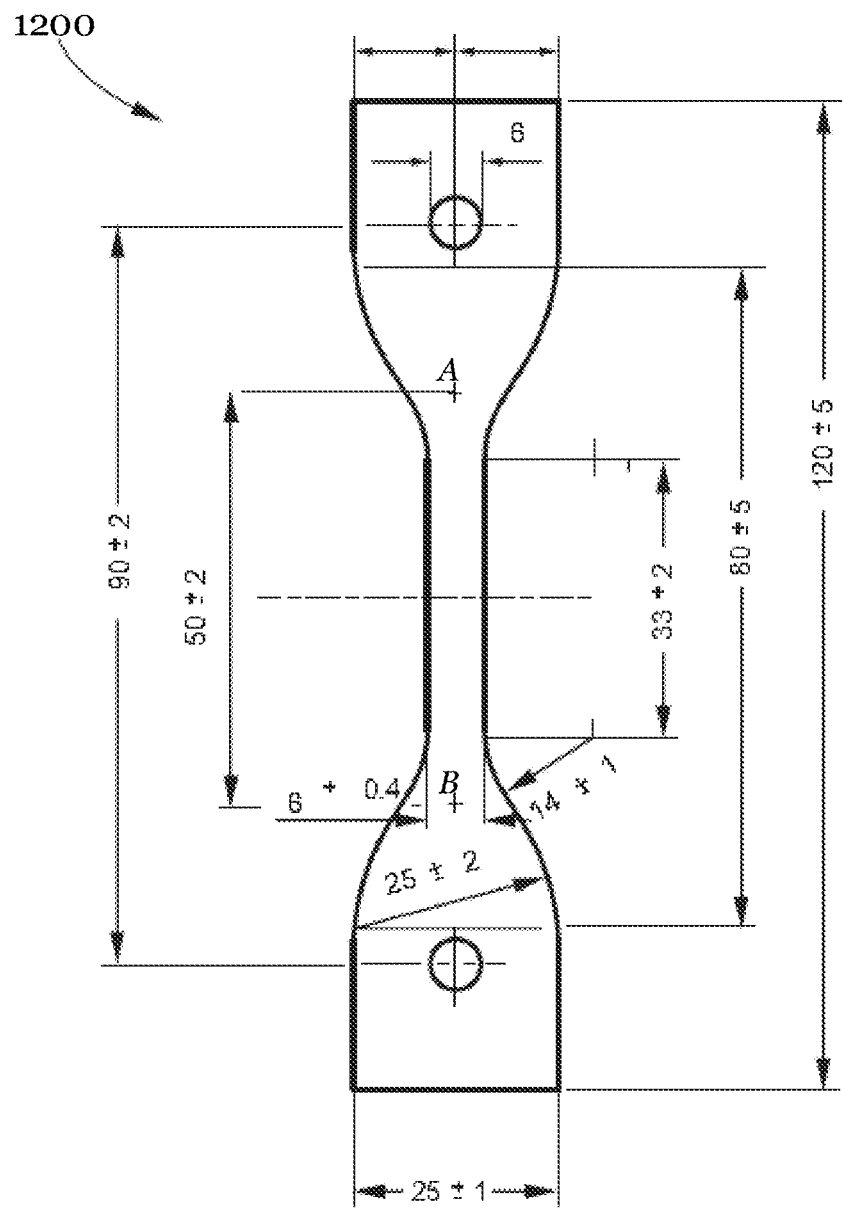
FIGS. 12A-12C show specimens and a test jig for testing a material's oxidation resistance.
Figure 12B:
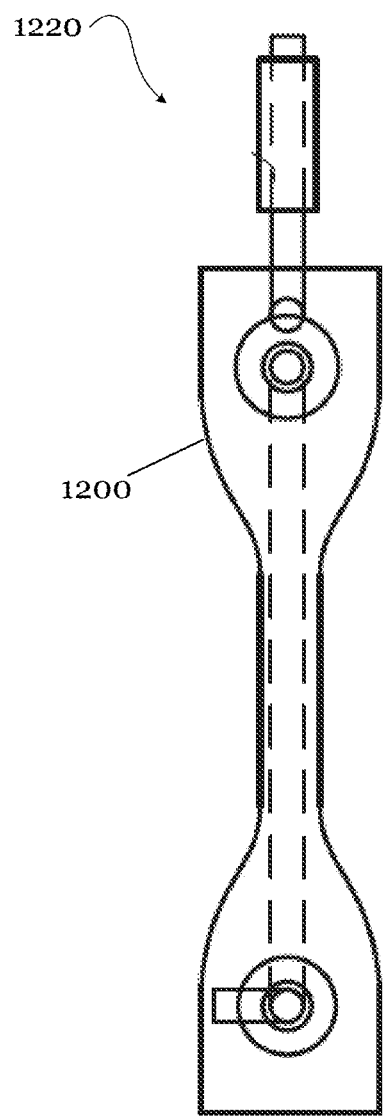
Figure 12C:
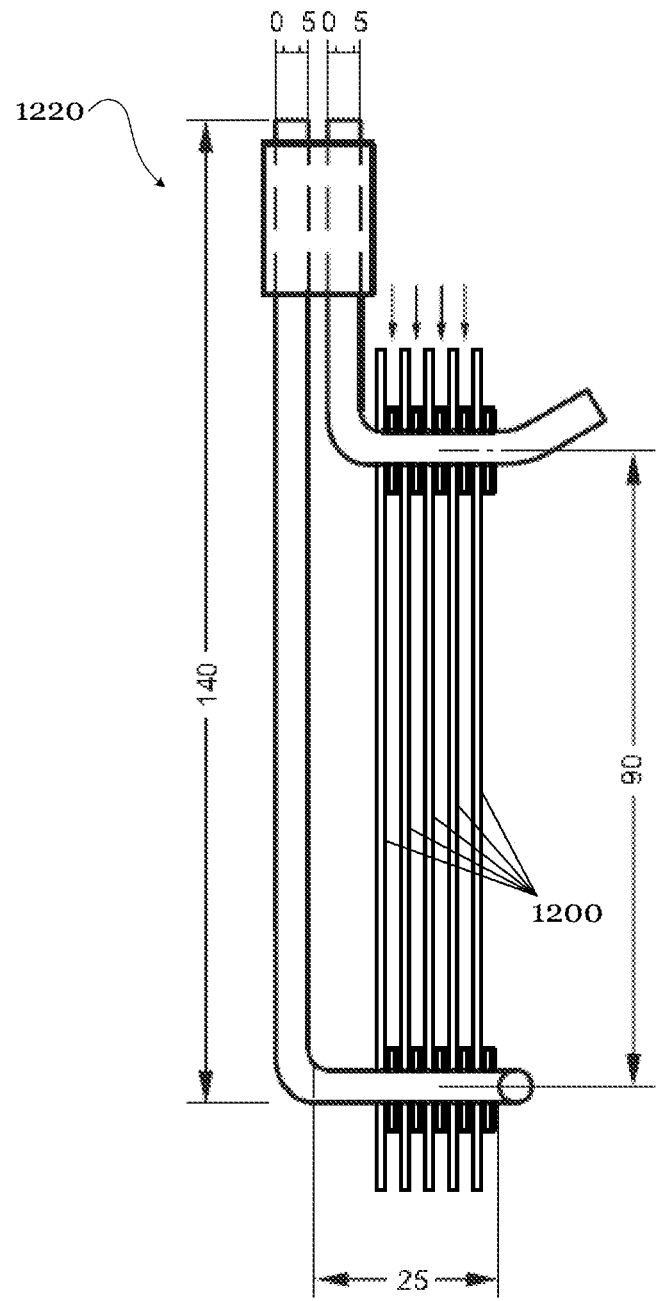

To test samples for oxidation resistance, sample specimens 1200 of exemplary separators are first cut to a shape as generally set forth in FIG. 12A. The specimens 1200 are then placed in a sample holder 1220 as generally shown in FIGS. 12B and 12C.

A first sample set is tested dry, at time=0 hours, for elongation percentage to break. The elongation is based upon the 50±2 mm distance as measured from points A and B in FIG. 12A. For instance, if points A and B are stretched to a distance of 300% upon the sample breaking, then the final distance between A and B would be 150±6 mm.

The elongation test is designed to simulate extended exposure to electrolyte in a cycling battery in a shortened time period. The samples 1200 are first fully submersed in isopropanol, drained and then submersed in water for 1 to 2 seconds. The samples are then submersed in an electrolyte solution. The solution is prepared by adding, in order, 360 ml of 1.28 specific gravity sulfuric acid, 35 ml of 1.84 specific gravity sulfuric acid, then 105 ml of 35% hydrogen peroxide. The solution is kept at 80° C. and the samples are submerged in the solution for an extended period. Samples may be tested for elongation at regular time intervals, such as 20 hours, 40 hours, 60 hours, 80 hours, etc. To test at these intervals, the samples 1200 are remove from the 80° C. electrolyte bath and placed under luke-warm running water until the acid has been removed. The elongation can then be tested.

In accordance with at least selected embodiments, the present disclosure or invention is directed to improved battery separators, Low ER or high conductance separators, improved lead acid batteries, such as flooded lead acid batteries, high conductance batteries, and/or, improved vehicles including such batteries, and/or methods of manufacture or use of such separators or batteries, and/or combinations thereof. In accordance with at least certain embodiments, the present disclosure or invention is directed to improved lead acid batteries incorporating the improved separators and which exhibit increased conductance.

Exemplary separators may also be evaluated with respect to oxidation resistance after a comprehensive life test, such as SAE-J2801-Comprehensive Life Test for 12 V Automotive Storage Batteries.

Puncture Resistance

In certain selected embodiments, exemplary separators may be characterized with an increased puncture resistance. For instance a puncture resistance of approximately 9 N or higher, 9.5 N or higher, 10 N or higher, 10.5 N or higher, 11 N or higher, 11.5 N or higher 12 N or higher, 12.5 N or higher, 13 N or higher, 13.5 N or higher, 14 N or higher, 14.5 N or higher, 15 N or higher, 15.5 N or higher, 16 N or higher, 16.5 N or higher, 17 N or higher, 17.5 N or higher, 18 N or higher, 18.5 N or higher, 19 N or higher, 19.5 N or higher, or 20 N or higher. In certain embodiments, exemplary separators may be preferably defined with a puncture resistance of approximately 9 N to approximately 20 N or higher, or more preferably approximately 11 N to approximately 20 N or higher.

Figure 13:
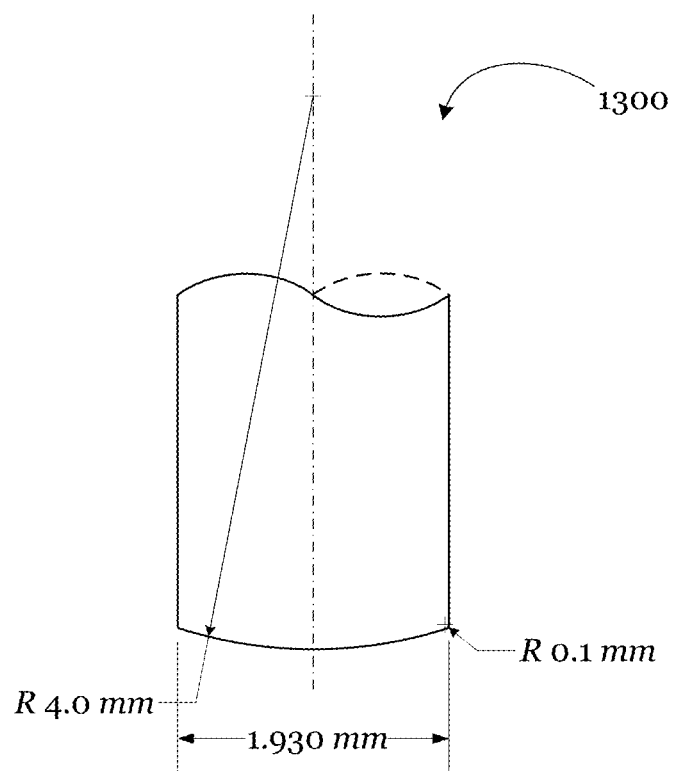
FIG. 13 depicts a puncture tip.

The puncture resistance may be measured as the force required to puncture the porous membrane utilizing the tip 1300 as generally depicted in FIG. 13. The puncture base in which the porous membrane is supported while the tip 1300 punctures the membrane may generally be described as a base having a 6.5 mm diameter straight hole with a 10 mm depth. The travel limit of the tip may be approximately 4 mm to approximately 8 mm below the puncture base surface. The puncture tip 1300 is linearly translated into the membrane at a rate of approximately 5 mm/s.

Additives/Surfactants

In certain embodiments, exemplary separators may contain one or more performance enhancing additives and/or coating added to the separator or porous membrane. The performance enhancing additive and/or coating may be surfactants, wetting agents, colorants, antistatic additives and/or coatings, antimony suppressing additives and/or coatings, UV-protection additives and/or coatings, antioxidants, and/or the like, and combinations thereof. In certain embodiments, the additive and/or coating surfactants may be ionic, or non-ionic surfactants, or a combination thereof.

Such performance enhancing additives and/or coatings have been found to reduce hydrogen ($H_2$) generation, and accordingly reduce water loss. Such reduced water loss helps mitigate the corrosion of the grid. The inventors have noticed that excessive grid corrosion tends to exacerbate grid warping.

Certain suitable surfactants may have HLB values less than 6, preferably less than 3. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like, or any combination thereof for that lead acid batteries. Suitable surfactants include surfactants such as salts of alkyl sulfates; alkylarylsulfonate salts; alkylphenolalkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary, tertiary amines, or quaternary amines); block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyetboxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive may be represented by a compound of Formula (I)

in which:
R is a linear or non-aromatic hydrocarbon radical with 10 to 4200 carbon atoms, preferably 13 to 4200, which may be interrupted by oxygen atoms;
$R^1$=H, —$(CH_2)_k COOM_{1/x}^{x+}$, or —$(CH_2)_k$—$SO_3 M_{1/x}^{x+}$, preferably H, where k=1 or 2;
M is an alkali metal or alkaline-earth metal ion, $H^+$ or $NH_4^+$, where not all the variables M simultaneously have the meaning $H^+$;
n=0 or 1;
m=0 or an integer from 10 to 1400; and
x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals may be interrupted by oxygen atoms (i.e., contain one or more ether groups).

R is preferably a straight-chain or branched aliphatic hydrocarbon radical which may be interrupted by oxygen atoms. Saturated, uncross-linked hydrocarbon radicals are quite particularly preferred. However, as noted above, R may, in certain embodiments, be aromatic ring-containing.

Through the use of the compounds of Formula (I) for the production of battery separators, they may be effectively protected against oxidative destruction.

Battery separators are preferred which contain a compound according to Formula (I) in which:

R is a hydrocarbon radical with 10 to 180, preferably 12 to 75 and quite particularly preferably 14 to 40 carbon atoms, which may be interrupted by 1 to 60, preferably 1 to 20 and quite particularly preferably 1 to 8 oxygen atoms, particularly preferably a hydrocarbon radical of formula $R^2—[(OC_2H_4)_p(OC_3H_6)_q]—$, in which:

$R^2$ is an alkyl radical with 10 to 30 carbon atoms, preferably 12 to 25, particularly preferably 14 to 20 carbon atoms, wherein $R^2$ can be linear or non-linear such as containing an aromatic ring;

P is an integer from 0 to 30, preferably 0 to 10, particularly preferably 0 to 4; and q is an integer from 0 to 30, preferably 0 to 10, particularly preferably 0 to 4;

compounds being particularly preferred in which the sum of p and q is 0 to 10, in particular 0 to 4;

n=1; and m=0.

Formula $R^2—[(OC_2H_4)_p(OC_3H_6)_q]—$ is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:

R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;

n=0;

m is an integer from 10 to 1400; and x=1 or 2.

Salt Additives

In certain embodiments, suitable additives may include, in particular, polyacrylic acids, polymethacrylic acids and acrylic acid-methacrylic acid copolymers, whose acid groups are at least partly neutralized, such as by preferably 40%, and particularly preferably by 80%. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium ($NR_4$, wherein R is either hydrogen or a carbon functional group). Poly(meth)acrylic acids may include polyacrylic acids, polymethacrylic acids, and acrylic acid-methacrylic acid copolymers. Poly(meth)acrylic acids are preferred and in particular polyacrylic acids with an average molar mass Mw of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight and preferably at least 80% by weight (meth)acrylic acid monomer; the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

In some embodiments, the porous polyolefin porous membrane may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

Ratios

In certain select embodiments, the membrane may be prepared by combining, by weight, about 5-15% polymer, in some instances, about 10% polymer (e.g., polyethylene), about 10-75% filler (e.g., silica), in some instances, about 30% filler, and about 10-85% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler: polymer ratio (by weight) may be about (or may be between about these specific ranges) such as 2:1, 2.5:1, 3:1, 3.5:1, 4.0:1, 4.5:1, 5.0:1, 5.5:1 or 6:1. The filler: polymer ratio (by weight) may be from about 1.5:1 to about 6:1, in some instances, 2:1 to 6:1, from about 2:1 to 5:1, from about 2:1 to 4:1, and in some instances, from about 2:1 to about 3:1. The amounts of the filler, the oil, and polymer are all balanced for runnability and desirable separator properties, such as electrical resistance, basis weight, puncture resistance, bending stiffness, oxidation resistance, porosity, physical strength, tortuosity, and the like.

In accordance with at least one embodiment, the porous membrane can include an UHMWPE mixed with a processing oil and precipitated silica. In accordance with at least one embodiment, the porous membrane can include an UHMWPE mixed with a processing oil, additive and precipitated silica. The mixture may also include minor amounts of other additives or agents as is common in the separator arts (e.g., surfactants, wetting agents, colorants, antistatic additives, antioxidants, and/or the like, and any combination thereof). In certain instances, the porous polymer layer may be a homogeneous mixture of 8 to 100% by volume of polyolefin, 0 to 40% by volume of a plasticizer and 0 to 92% by volume of inert filler material. The preferred plasticizer is petroleum oil. Since the plasticizer is the component which is easiest to remove, by solvent extraction and drying, from the polymer-filler-plasticizer composition, it is useful in imparting porosity to the battery separator.

In certain embodiments, the porous membrane disclosed herein may contain latex and/or rubber, which may be a natural rubber, synthetic rubber, or a mixture thereof. Natural rubbers may include one or more blends of polyisoprenes, which are commercially available from a variety of suppliers. Exemplary synthetic rubbers include methyl rubber, polybutadiene, chloropene rubbers, butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber and copolymer rubbers, such as styrene/butadiene rubbers, acrylonitrile/butadiene rubbers, ethylene/propylene rubbers (EPM and EPDM) and ethylene/vinyl acetate rubbers. The rubber may be a cross-linked rubber or an uncross-linked rubber; in certain preferred embodiments, the rubber is uncross-linked rubber. In certain embodiments, the rubber may be a blend of cross-linked and uncross-linked rubber. The rubber may be present in the separator in an amount that is at least about 1%, 2%, 3%, 4%, 5%, 6%, 7%), 8%, 9%, or 10% by weight relative to the final separator weight (the weight of the polyolefin separator sheet or layer containing rubber and/or latex). In certain embodiments, the rubber may be present in an amount from approximately 1-6%, approximately 3-6% by weight, approximately 3% by weight, and approximately 6% by weight. The porous membrane may have a filler to polymer and rubber (filler: polymer and rubber) weight ratio of approximately 2.6:1.0. The amounts of the rubber, filler, oil, and polymer are all balanced for runnability and desirable separator properties, such as electrical resistance, basis weight, puncture resistance, bending stiffness, oxidation resistance, porosity, physical strength, tortuosity, and the like.

A porous membrane made in accordance with the present invention, comprising polyethylene and filler (e.g., silica) typically has a residual oil content; in some embodiments, such residual oil content is from about 0.5% up to about 40% of the total weight of the separator membrane (in some instances, about 10-40% of the total weight of the separator membrane, and in some instances, about 20-40% of that total weight). In certain select embodiments herein, some to all of the residual oil content in the separator may be replaced by the addition of more of a performance enhancing additive, such as a surfactant, such as a surfactant with a hydrophilic-lipophilic balance ("HLB") less than 6, or such as a nonionic surfactant. For example, a performance enhancing additive such as a surfactant, such as a nonionic surfactant, may comprise up to 0.5% all the way up to all of the amount of the residual oil content (e.g., all the way up to 20% or 30% or even 40%) of the total weight of the porous separator membrane, thereby partially or completely replacing the residual oil in the separator membrane.

Manufacture

In some embodiments, an exemplary porous membrane may be made by mixing the constituent parts in an extruder. For example, about 30% by weight filler with about 10% by weight UHMWPE, and about 60% processing oil may be mixed in an extruder. The exemplary porous membrane may be made by passing the constituent parts through a heated extruder, passing the extrudate generated by the extruder through a die and into a nip formed by two heated presses or calender stack or rolls to form a continuous web. A substantial amount of the processing oil from the web may be extracted by use of a solvent, thereby followed with removing the solvent by drying. The web may then be cut into lanes of predetermined width, and then wound onto rolls. Additionally, the presses or calender rolls may be engraved with various groove patterns to impart ribs, grooves, textured areas, embossments, and/or the like as substantially described herein.

Manufacture with Rubber

In some embodiments, an exemplary porous membrane may be made by mixing the constituent parts in an extruder. For example, about 5-15% by weight polymer (e.g., polyethylene), about 10-75% by weight filler (e.g., silica), about 1-50% by weight rubber and/or latex, and about 10-85% processing oil may be mixed in an extruder. The exemplary porous membrane may be made by passing the constituent parts through a heated extruder, passing the extrudate generated by the extruder through a die and into a nip formed by two heated presses or calender stack or rolls to form a continuous web. A substantial amount of the processing oil from the web may be extracted by use of a solvent. The web may then be dried and slit into lanes of predetermined width, and then wound onto rolls. Additionally, the presses or calender rolls may be engraved with various groove patterns to impart ribs, grooves, textured areas, embossments, and/or the like as substantially described herein. The amounts of the rubber, filler, oil, and polymer are all balanced for runnability and desirable separator properties, such as electrical resistance, basis weight, puncture resistance, bending stiffness, oxidation resistance, porosity, physical strength, tortuosity, and the like.

In addition to being added to the constituent parts of the extruder, certain embodiments combine the rubber to the porous membrane after extrusion. For example, the rubber may be coated onto one or both sides, preferably on the side facing the negative electrode, with a liquid slurry comprising the rubber and/or latex, optionally, silica, and water, and then dried such that a film of this material is formed upon the surface of an exemplary porous membrane. For better wettability of this layer, known wetting agents may be added to the slurry for use in lead acid batteries. In certain embodiments, the slurry can also contain one or more performance enhancing additives as described herein. After drying, a porous layer and/or film forms on the surface of the separator, which adheres very well to the porous membrane and increases electrical resistance only insignificantly, if at all. After the rubber is added, it may be further compressed using either a machine press or calender stack or roll. Other possible methods to apply the rubber and/or latex are to apply a rubber and/or latex slurry by dip coat, roller coat, spray coat, or curtain coat one or more surfaces of the separator, or any combination thereof. These processes may occur before or after the processing oil has been extracted, or before or after it is slit into lanes.

A further embodiment of the present invention involves depositing rubber onto the membrane by impregnation and drying.

Manufacture with Performance Enhancing Additives

In certain embodiments, performance enhancing additives or agents (e.g., surfactants, wetting agents, colorants, antistatic additives, antioxidants, and/or the like, and any combination thereof) may also be mixed together with the other constituent parts within the extruder. A porous membrane according to the present disclosure may then be extruded into the shape of a sheet or web, and finished in substantially the same way as described above.

In certain embodiments, and in addition or alternative to adding into the extruder, the additive or additives may, for example, be applied to the separator porous membrane when it is finished (e.g., after extracting a bulk of the processing oil, and before or after the introduction of the rubber). According to certain preferred embodiments, the additive or a solution (e.g., an aqueous solution) of the additive is applied to one or more surfaces of the separator. This variant is suitable in particular for the application of non-thermostable additives and additives which are soluble in the solvent used for the extraction of processing oil. Particularly suitable as solvents for the additives according to the invention are low-molecular-weight alcohols, such as methanol and ethanol, as well as mixtures of these alcohols with water. The application can take place on the side facing the negative electrode, the side facing the positive electrode, or on both sides of the separator. The application may also take place during the extraction of the pore forming agent (e.g., the processing oil) while in a solvent bath. In certain select embodiments, some portion of a performance enhancing additive, such as a surfactant coating or a performance enhancing additive added to the extruder before the separator is made (or both) may combine with the antimony in the battery system and may inactivate it and/or form a compound with it and/or cause it to drop down into the mud rest of the battery and/or prevent it from depositing onto the negative electrode. The surfactant or additive may also be added to the electrolyte, the glass mat, the battery case, pasting paper, pasting mat, and/or the like, or combinations thereof.

In certain embodiments, the additive (e.g., a non-ionic surfactant, an anionic surfactant, or mixtures thereof) may be present at a density or add-on level of at least 0.5 $g/m^2$, 1.0 $g/m^2$, 1.5 $g/m^2$, 2.0 $g/m^2$, 2.5 $g/m^2$, 3.0 $g/m^2$, 3.5 $g/m^2$, 4.0 $g/m^2$, 4.5 $g/m^2$, 5.0 $g/m^2$, 5.5 $g/m^2$, 6.0 $g/m^2$, 6.5 $g/m^2$, 7.0 $g/m^2$, 7.5 $g/m^2$, 8.0 $g/m^2$, 8.5 $g/m^2$, 9.0 $g/m^2$, 9.5 $g/m^2$ or 10.0 $g/m^2$ or even up to about 25.0 $g/m^2$. The additive may be present on the separator at a density or add-on level between 0.5-15 $g/m^2$, 0.5-10 $g/m^2$, 1.0-10.0 $g/m^2$, 1.5-10.0 $g/m^2$, 2.0-10.0 $g/m^2$, 2.5-10.0 $g/m^2$, 3.0-10.0 $g/m^2$, 3.5-10.0 $g/m^2$, 4.0-10.0 $g/m^2$, 4.5-10.0 $g/m^2$, 5.0-10.0 $g/m^2$, 5.5-10.0 $g/m^2$, 6.0-10.0 $g/m^2$, 6.5-10.0 $g/m^2$, 7.0-10.0 $g/m^2$, 7.5-10.0 $g/m^2$, 4.5-7.5 $g/m^2$, 5.0-10.5 $g/m^2$, 5.0-11.0 $g/m^2$, 5.0-12.0 $g/m^2$, 5.0-15.0 $g/m^2$, 5.0-16.0 $g/m^2$, 5.0-17.0 $g/m^2$, 5.0-18.0 $g/m^2$, 5.0-19.0 $g/m^2$, 5.0-20.0 $g/m^2$, 5.0-21.0 $g/m^2$, 5.0-22.0 $g/m^2$, 5.0-23.0 $g/m^2$, 5.0-24.0 $g/m^2$, or 5.0-25.0 $g/m^2$.

The application may also take place by dipping the battery separator in the additive or a solution of the additive (solvent bath addition) and removing the solvent if necessary (e.g., by drying). In this way the application of the additive may be combined, for example, with the extraction often applied during membrane production. Other preferred methods are to spray the surface with additive, dip coat, roller coat, or curtain coat the one or more additives on the surface of separator.

In certain embodiments described herein, a reduced amount of ionic, cationic, anionic, or non-ionic surfactant is added to the inventive separator. In such instances, a desirable feature may include lowered total organic carbons and/or lowered volatile organic compounds (because of the lower amount of surfactant) may produce a desirable inventive separator according to such embodiment.

Combined with a Fibrous Mat

In certain embodiments, exemplary separators according to the present disclosure may be combined with one or more other layer(s) (laminated or otherwise), such as a fibrous layer or fibrous mat having enhanced wicking properties and/or enhanced wetting or holding of electrolyte properties. The fibrous mat may be woven, nonwoven, fleeces, mesh, net, single layered, multi-layered (where each layer may have the same, similar or different characteristics than the other layers), composed of glass fibers, or synthetic fibers, fleeces or fabrics made from synthetic fibers or mixtures with glass and synthetic fibers or paper, or any combination thereof. The fibrous mat may be a single piece or a separate strip in each side lane.

In certain embodiments, the fibrous mat (laminated or otherwise) may be used as a carrier for additional materials. The addition material may include, for example, carbon, $BaSO_4$, rubber and/or latex, optionally silica, water, and/or one or more performance enhancing additive, such as various additives described herein, or any combination thereof. By way of example, the additional material may be delivered in the form of a slurry that may then be coated onto one or more surfaces of the fibrous mat to form a film, or soaked and impregnated into the fibrous mat.

When the fibrous layer is present, it is preferred that the porous membrane has a larger surface area than the fibrous layers. Thus, when combining the porous membrane and the fibrous layers, the fibrous layers do not completely cover the porous layer. It is preferred that at least two opposing edge regions of the membrane layer remain uncovered to provide edges for heat sealing which facilitates the optional formation of pockets or envelopes and/or the like. Such a fibrous mat may have a thickness that is at least 100 µm, in some embodiments, at least about 200 µm, at least about 250 µm, at least about 300 µm, at least about 400 µm, at least about 500 µm, at least about 600 µm, at least about 700 µm, at least about 800 µm, at least about 900 µm, at least about 1 mm, at least about 2 mm, and so forth. The subsequent laminated separator may be cut into pieces. In certain embodiments, the fibrous mat is laminated to a ribbed surface of the porous membrane porous membrane. In certain embodiments, handling and/or assembly advantages are provided to the battery maker with the improved separator described herein, as it may be supplied in roll form and/or cut piece form. And as mentioned previously, the improved separator may be a standalone separator sheet or layer without the addition of one or more fibrous mats or the like.

If the fibrous mat is laminated to the porous membrane, they may be bonded together by adhesive, heat, ultrasonic welding, compression, and/or the like, or any combination thereof. And, the fibrous mat may be a PAM or NAM retention mat.

CONCLUSION

The details of one or more exemplary embodiments, aspects, or objects, are in the detailed description and claims set forth hereinafter. Other features, objects, and advantages will be apparent from the detailed description and claims set forth hereinafter. In accordance with one or more select embodiments, aspects, or objects, the present disclosure or invention at least addresses, and in some cases exceeds, the above problems, issues, or needs.

In accordance with at least select exemplary embodiments, aspects, or objects, the present invention addresses at least the aforementioned issues or needs and provides novel or improved separators, novel or improved batteries utilizing novel or improved separators, and novel or improved systems utilizing the novel or improved batteries. In accordance with at least certain exemplary embodiments, aspects, or objects, the present disclosure or invention is directed to novel or improved battery separators, battery cells, batteries, systems, and/or methods of manufacture and/or methods of use of such novel or improved battery separators, battery cells, batteries, and/or systems.

In accordance with at least certain exemplary embodiments, aspects, or objects, the present disclosure or invention is directed to improved separators for lead acid batteries having at least an improved formulation and rib configuration for reducing or mitigating electrode plate warping and/or the effects of electrode plate warping; reduced occurrences of separator punctures; reduced occurrences of battery electrode shorting; and/or the like; and/or combinations thereof. In accordance with at least certain exemplary embodiments, aspects, or objects, the present disclosure or invention is directed to improved separators for lead acid batteries that may be characterized by at least one or more of: plate-warp resistant; puncture resistant; oxidation resistant; acid mixing; reduced electrical resistance; improved wettability; improved fillers, optimized porosity; optimized tortuosity, reduced thickness, reduced backweb thickness; ribbed; negative cross-ribs; reduced oil content; increased acid diffusion; increased oxidation resistance or improved oxidation stability; optimized porosity; optimized pore tortuosity; improved acid diffusion; and/or the like; and/or combinations thereof. In accordance with at least certain exemplary embodiments, aspects, or objects, the present disclosure or invention is directed to improved separators for lead acid batteries that may provide for at least one or more of: low water loss in a battery and/or battery cell; decreased electrical resistance in a battery and/or battery cell; increased acid mixing in a battery and/or battery cell; reduced acid stratification in a battery and/or battery cell; improved performance in a battery and/or battery cell; increased life in a battery and/or battery cell; reduced failure rates in a battery and/or battery cell; and/or the like; and/or combinations thereof.

In accordance with at least certain exemplary embodiments, aspects, or objects, the present disclosure or invention is directed to separators, and/or improved battery cells and/or batteries utilizing improved separators, and/or improved systems utilizing improved battery cells and/or batteries utilizing improved separators that overcome at least the aforementioned problems and/or issues. For instance, and by way of example only, improved battery cells and/or batteries may be characterized by at least one or more of: enhanced performance; reduced failure rates; improved life; decreased occurrences of plate shorting; decreased occurrences of separator punctures; reduced water loss, reduced float current; improved end-of-charge current; increased charge acceptance; improved energy throughput; reduced antimony (Sb) poisoning; reduced acid stratification, reduced acid starvation; reduced dendrite formation; reduced internal electrical resistance; improved cold cranking amps ("CCA"), improved uniformity; improved cycling performance; and/or the like; and/or combinations thereof.

In accordance with at least select exemplary embodiments, aspects, or objects, the present disclosure or invention is at least directed to novel or improved battery separators, warp resistant separators, puncture resistant separators, resilient separators, battery cells, batteries, methods involving the same, systems using the same, vehicles using the same, methods of manufacturing the same, the methods using the same, and combinations thereof.

In accordance with at least certain exemplary embodiments, aspects, or objects, the present disclosure or invention is directed to novel or improved battery separators as used in a variety of batteries and/or applications. An exemplary list of such batteries and/or applications includes: flat-plate batteries; tubular batteries; flooded lead acid batteries; enhanced flooded lead acid batteries ("EFBs"); valve regulated lead acid ("VRLA") batteries; deep-cycle batteries; gel batteries; absorptive glass mat ("AGM") batteries; inverter batteries; power collections batteries; power storage batteries; batteries for internal combustion engines; auxiliary batteries; starting-lighting-ignition ("SLI") batteries; idle-start-stop ("ISS") batteries; vehicle batteries; passenger vehicle batteries; automobile batteries; truck batteries; motorcycle batteries; all-terrain vehicle batteries; marine batteries; aircraft batteries, forklift batteries; golf cart or golf car batteries; hybrid-electric vehicle ("HEV") batteries; micro-hybrid vehicle batteries; electric vehicle batteries, e-rickshaw batteries; e-trike batteries; e-bike batteries; uninterruptible power supply ("UPS") batteries; batteries with high CCA requirements; batteries operating in a partial state of charge ("PSoC"); and/or the like, and combinations thereof.

In accordance with at least selected exemplary embodiments, aspects, or objects, a plethora of systems having an inventive battery incorporating an inventive separator as described herein are provided. The exemplary system may be one or more of: a vehicle; an UPS; an auxiliary power system; a power collector system; a renewable energy power collector system; a wind energy power collector system; a solar energy power collector system; a backup power system; an inverter; and combinations thereof. Further, exemplary vehicles may be one of: an automobile; a passenger vehicle; a truck; a forklift; a hybrid vehicle; a HEV; a micro-hybrid vehicle, an ISS vehicle; an electric vehicle; a water vessel; an aircraft; an e-rickshaw; an e-trike; an e-bike; a motorcycle; an all-terrain vehicle; a golf cart or golf car; and/or the like; and combinations thereof.

In a first exemplary embodiment of the present disclosure or invention, an electrode and separator assembly is provided with an electrode plate having a grid and an active material thereon. The grid is provided with at least one grid edge. Furthermore, the active material may be non-uniformly distributed on the grid. In another embodiment, the grid may be thinner than approximately 1.00 mm. In yet another embodiment, the grid may have a non-uniform geometry.

A porous membrane is provided disposed adjacent to the electrode plate with a first membrane surface. The first membrane surface has a first surface edge and a second surface edge and a plurality of ribs extending from the membrane surface; the plurality of ribs extending from the first surface edge to the second surface edge.

In another exemplary embodiment of the present invention or disclosure, an electrode and separator assembly is provided with an electrode plate, which may be either a positive electrode or a negative electrode, having a grid and an active material non-uniformly distributed thereon. The grid is provided with a first grid edge and a second grid edge. A porous membrane is disposed adjacent to the electrode plate. The porous membrane has a first side lane adjacent to a first membrane edge and a second side lane adjacent to a second membrane edge, and a central portion disposed between the first side lane and the second side lane. The porous membrane is provided with a first membrane surface having a plurality of primary ribs extending from or into the first membrane surface within the central portion, and a first array of secondary ribs disposed within the first side lane and a second array of secondary ribs disposed within the second side lane.

In one aspect of the present invention, the first grid edge may be disposed within the first side lane, and the second grid edge may be disposed within the second side lane. The plurality of primary ribs may have a uniform height and a uniform distribution. Whereas either or both of the first array of secondary ribs and the second array of secondary ribs are more closely spaced that the plurality of primary ribs. The plurality of primary ribs, the first array of secondary ribs, and/or the second array of secondary ribs may be longitudinally disposed and substantially parallel to the machine direction of the porous membrane or laterally disposed and substantially parallel to the cross-machine direction of the porous membrane. Either or both of the first array of secondary ribs and the second array of secondary ribs may substantially parallel to, orthogonal to, or angled with respect to the plurality of primary ribs. The porous membrane may have a second membrane surface having a third array of ribs thereon.

In another aspect of the present invention, the grid may be either a stamped grid, a cast grid, or an expanded metal grid. Furthermore, the grid may be subject to warping. The grid may have a first grid surface and a second grid surface, and wherein the active material may be more heavily distributed on the first grid surface as compared to the second grid surface. Furthermore, the active material may be non-uniformly distributed on a surface of the grid.

In yet another aspect, any of the plurality of primary ribs, the first array of secondary ribs, the second array of secondary ribs, and/or the third array of ribs may be one or more of: solid ribs, discrete broken ribs, continuous ribs, discontinuous ribs, discontinuous peaks, discontinuous protrusions, angled ribs, diagonal ribs, linear ribs, ribs that may be longitudinally extending substantially in a machine direction of the porous membrane, ribs that may be laterally extending substantially in a cross-machine direction of the porous membrane, ribs that may be transversely extending substantially in the cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

In certain embodiments, the porous membrane may be one of an envelope, and a hybrid envelope, a sleeve separator, a pocket separator, and a wrap separator. The porous membrane may have at least one sealed edge formed from a crimp, a weld, an ultrasonic weld, a thermal weld, an adhesive, and combinations thereof. The porous membrane may also be a cut-piece.

In another exemplary embodiment of the present invention or disclosure, an electrode and separator assembly is provided with an electrode plate, which may be either a positive electrode or a negative electrode, having a grid and an active material non-uniformly distributed thereon. A porous membrane may be provided with a first membrane surface having an array of primary ribs disposed thereon and extending from a first membrane edge to a second membrane edge; wherein the array of primary ribs have a uniform height.

Another aspect of the present invention or disclosure provides the grid with a first grid surface and a second grid surface, with the active material more heavily distributed on the first grid surface as compared to the second grid surface. Alternatively, or in addition to, the active material may be non-uniformly distributed on a surface of the grid. The grid may be one of the group consisting of a stamped grid, a cast grid, and an expanded metal grid. In addition, the grid may be subject to warping. Either of the first membrane surface or the second membrane surface may be adjacent to the electrode plate.

In another aspect of the present invention or disclosure, the array of primary ribs may be disposed longitudinally and substantially parallel to a machine direction of the porous membrane and may be uniformly or non-uniformly laterally spaced across a cross-machine direction of the porous membrane. The porous membrane is provided with a second surface and a second array of ribs may extend therefrom.

In another aspect of the present invention or disclosure, either or both of the array of primary ribs and/or the second array of ribs may be one or more of: solid ribs, discrete broken ribs, continuous ribs, discontinuous ribs, discontinuous peaks, discontinuous protrusions, angled ribs, diagonal ribs, linear ribs, ribs that may be longitudinally extending substantially in a machine direction of the porous membrane, ribs that may be laterally extending substantially in a cross-machine direction of the porous membrane, ribs that may be transversely extending substantially in the cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

In one exemplary aspect, the porous membrane may be one of an envelope separator, a hybrid envelope separator, a sleeve separator, a pocket separator, a wrap separator, a cut-piece separator, and a leaf separator; wherein the envelope, hybrid envelope, sleeve separator, pocket separator, and wrap separator may have at least one sealed edge formed from a crimp, a weld, an ultrasonic weld, a thermal weld, an adhesive, and combinations thereof.

In yet another exemplary embodiment of the present invention or disclosure, an electrode and separator assembly may be provided with an electrode plate provided with a grid and active material. the grid may have a first grid edge and a second grid edge, and the active material may be non-uniformly distributed on the grid. A porous membrane further may be provided with a first membrane surface with a support structure supporting the first grid edge and the second grid edge. The first grid edge may have at least a first grid corner, and the second grid edge may have at least a second grid corner. The support structure may have a first array of ribs having a uniform height.

The grid may have a first grid surface and a second grid surface, wherein the active material may be more heavily distributed on the first grid surface as compared to the second grid surface. Alternatively, or in addition to, the active material may be non-uniformly distributed on a surface of the grid. The grid may be one of the group consisting of a stamped grid, a cast grid, and an expanded metal grid. The electrode plate may be subject to warping.

In certain exemplary aspects, the first array of ribs may be uniformly spaced laterally from a first membrane edge of the porous membrane to a second membrane edge of the porous membrane. The first array of ribs may also be uniformly or non-uniformly spaced laterally from a first membrane edge of the porous membrane to the second membrane edge of the porous membrane.

In other exemplary aspects of the present disclosure, the first array of ribs may be more closely spaced in a first membrane area adjacent to the first membrane edge and more closely spaced in a second membrane area adjacent to the second membrane edge as compared to a rib spacing in a center portion of the porous membrane.

In yet another exemplary aspect of the present disclosure, the first array of ribs may be uniformly or non-uniformly spaced laterally from a first grid edge to a second grid edge. In addition, the first array of ribs may be more closely spaced in a first area adjacent to the first grid edge and more closely spaced in a second area adjacent to the second grid edge as compared to a rib spacing in a center portion of the grid.

In yet another aspect of the present disclosure, the support structure may have a fibrous mat; the fibrous mat may extend from the first grid edge to the second grid edge. The support structure may have a first fibrous mat adjacent to the first grid edge, and a second fibrous mat adjacent to the second grid edge.

In another exemplary aspect, the porous membrane may be one of an envelope separator, a hybrid envelope separator, a sleeve separator, a pocket separator, a wrap separator, a cut-piece separator, and a leaf separator; wherein the envelope, hybrid envelope, sleeve separator, pocket separator, and wrap separator may have at least one sealed edge formed from a crimp, a weld, an ultrasonic weld, a thermal weld, an adhesive, and combinations thereof.

In yet another exemplary embodiment of the present disclosure, a lead acid battery may be provided with a separator as substantially described herein. The lead acid battery may operate in one of the following states of being in motion, stationary, in a backup power application, in deep-cycling applications, in cycling applications, in a partial state of charge, and combinations thereof.

Exemplary batteries may be one of: a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idle-start-stop ("ISS") vehicle battery, an automobile battery, a truck battery, a marine battery, a motorcycle battery, an all-terrain vehicle battery, a forklift battery, a golf cart battery, a hybrid-electric vehicle battery, an electric vehicle battery, an e-rickshaw battery, an e-trike battery, and an e-bike battery.

In yet another exemplary embodiment a system may be provided with a lead acid battery as described herein. The system may be provided with a vehicle, wherein the vehicle may be one of an automobile, a truck, a motorcycle, an all-terrain vehicle, a forklift, a golf cart, a hybrid vehicle, a hybrid-electric vehicle, an electric vehicle, an idle-start-stop ("ISS") vehicle, a water vessel, an e-rickshaw, an e-trike, and an e-bike. Furthermore, the system may operate in one of the following states: in motion, stationary, in a backup power application, in a deep-cycle application, in cycling applications, in a partial state of charge, and combinations thereof. The system further may be one of the following: an uninterruptible power supply, an energy reserve system, a power backup system, a renewable energy storage system, and combinations thereof.

In still another exemplary embodiment, a method for mitigating grid warp in an electrode and separator assembly may be provided. The method may provide an electrode plate with a grid susceptible to warping; and positioning a support structure adjacent to the grid. The support structure may include a battery separator. Additionally, the support structure may include a fibrous mat or mesh. An active material may be non-uniformly applied to the grid. The grid may have a perimeter. The support structure may overlap at least a portion of the grid perimeter. The support structure may be provided as a set of ribs extending from the porous membrane having a uniform height. The set of ribs may be longitudinally disposed in a machine direction of the porous membrane and the set of ribs may be evenly spaced from a first edge of the perimeter to a second edge of the perimeter in a lateral dimension in a cross-machine direction. Alternatively, or in addition to, the support structure may have or be a polygonal spacer. Alternatively, or in addition to, the support structure may have or be a fibrous mat. Alternatively, or in addition to, the support structure may have or be a first fibrous mat and a second fibrous mat, wherein the first fibrous mat is disposed to at least partially overlap a first edge of the perimeter; and the second fibrous mat is disposed to at least partially overlap a second edge of the perimeter. The method may further provide subjecting the electrode and separator assembly to elevated temperatures and/or thermal cycling.

In accordance with at least selected exemplary embodiments, aspects, or objects, the present disclosure or invention provides a separator whose components and physical attributes and features synergistically combine to address, in unexpected ways, previously unmet needs in the lead acid battery industry with an improved battery separator. In certain preferred exemplary embodiments, the present disclosure or invention provides a battery using a separator as described herein to address, in unexpected ways, previously unmet needs in the lead acid battery industry with an improved lead acid battery separator. In certain preferred exemplary embodiments, the present disclosure or invention provides a system using a battery as described herein to address, in unexpected ways, previously unmet needs in the lead acid battery industry with an improved system utilizing an inventive lead acid battery that utilizes an inventive separator as described herein.

In accordance with at least selected exemplary embodiments, aspects, or objects, the present invention solves, meets, and/or overcomes at least the problems, needs, and/or issues, which have heretofore been unsolved, unmet, and/or not addressed by the current state of the art. In accordance with at least certain objects, the present invention provides an improved separator, an improved cell or battery utilizing the improved separator, and/or an improved system using the improved separator, cell or battery that overcome at least certain of the aforementioned problems, issues or needs.

In accordance with at least select exemplary embodiments, aspects, or objects, the present disclosure or invention may address at least the aforementioned problems, issues or needs, and/or may provide novel or improved separators, warp resistant separators, and/or lead acid battery separators, novel or improved cells or batteries utilizing the novel or improved separators, and/or novel or improved systems utilizing the novel or improved separators, cells or batteries. In accordance with at least certain exemplary embodiments, aspects, or objects, the present disclosure or invention is directed to novel or improved battery separators, battery cells, batteries, systems, and/or methods of manufacture and/or methods of use of such novel or improved battery separators, battery cells, batteries, and/or systems.

Disclosed herein are exemplary embodiments of improved electrode plate and separator assemblies (400) for lead acid batteries, improved lead acid cells or batteries incorporating the improved assemblies, systems or vehicles incorporating the improved assemblies (400) and/or batteries (100), and methods related thereto. The electrode plate (200, 201) may have a grid (202) of a stamped, cast, or expanded metal manufacturing process. The grid (202) may have a non-uniform application of active material (203). The separators (300) preferably provide a support structure for resisting or mitigating any plate warping or plate deflection.

In accordance with at least selected embodiments, the present disclosure or invention is directed to separators, particularly separators for flooded lead acid batteries, capable of reducing or mitigating battery water loss, reducing antimony (Sb) poisoning, mitigating electrode plate grid warping or bowing or cupping, reducing or mitigating acid starvation; reducing or mitigating acid stratification; reducing or mitigating dendrite growth; reducing the effects of oxidation; reducing water loss; increasing wettability; improving acid diffusion; improving uniformity; and having reduced electrical resistance, capable of increasing cold cranking amps, and/or the like; and combinations thereof. In addition, disclosed herein are methods, systems, and battery separators for enhancing battery life; reducing battery water loss; reducing battery antimony (Sb) poisoning; reducing or mitigating electrode plate grid warping or bowing or cupping, reducing or mitigating acid starvation; reducing or mitigating acid stratification; reducing or mitigating dendrite growth; reducing the effects of oxidation; reducing internal resistance, increasing wettability; improving acid diffusion; improving cold cranking amps; improving uniformity; and/or the like; and any combination thereof in at least enhanced flooded lead acid batteries. In accordance with at least particular embodiments, the present disclosure or invention is directed to an improved separator for enhanced flooded lead acid batteries wherein the separator includes an improved formulation for reduced battery water loss and reduced antimony (Sb) poisoning, an improved separator grid-warp resistance, improved separator resiliency; and combinations thereof. In accordance with at least particular embodiments, the present disclosure or invention is directed to improved separators for enhanced flooded lead acid batteries wherein the separator includes an improved formulation including cross-linked components, performance enhancing additives or coatings, increased oxidation resistance, amorphous silica, higher oil absorption silica, higher silanol group silica, silica with an OH: Si ratio of 21:100 to 35:100, a polyolefin microporous membrane containing particle-like filler in an amount of 40% or more by weight of the membrane and polymer, such as ultrahigh molecular weight polyethylene ("UHMWPE"), decreased sheet thickness, reduced thickness, reduced oil content, increased wettability, increased acid diffusion, and/or the like, and any combination thereof.

In accordance with at least certain embodiments, aspects or objects, the present disclosure or invention is directed to or provides novel or improved separators for a variety of lead acid batteries and/or systems. In addition, exemplary embodiments disclosed herein are directed to novel or improved battery separators, warp resistant separators, battery cells incorporating the same, batteries incorporating the same, systems incorporating the same, and/or methods of manufacturing and/or of using the same, novel or improved lead acid batteries, and/or the like, and/or combinations thereof. At least selected embodiments are directed to novel or improved separators, batteries, and/or systems, such as those having or operating with a stamped plate electrode, a stamped grid electrode, non-uniform active material electrode, a warped plate electrode, or a plate electrode prone to warping utilizing the novel or improved separator, which provides for enhanced battery life, and/or reduced battery failure in lead acid batteries.

Disclosed herein are exemplary embodiments of improved electrode plate and separator assemblies (400) for lead acid batteries, improved lead acid cells or batteries incorporating the improved assemblies, systems or vehicles incorporating the improved assemblies (400) and/or batteries (100), and methods related thereto. The electrode plate (200, 201) may have a grid (202) of a stamped, cast, or expanded metal manufacturing process. The grid (202) may have a non-uniform application of active material (203). The separators (300) preferably provide a support structure for resisting or mitigating any plate warping or plate deflection.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The compositions and methods of the appended claims are not limited in scope by the specific compositions and methods described herein, which are intended as illustrations of a few aspects of the claims. Any composition(s) and/or method(s) that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches. Unless defined otherwise, all technical and scientific terms used herein have the same meanings as commonly understood by one of skill in the art to which the disclosed invention belongs. Publications cited herein and the materials for which they are cited are specifically incorporated by reference.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Additionally, the invention illustratively disclosed herein may be suitably practiced in the absence of any element that is not specifically disclosed herein.

What is claimed is:

1. An electrode and separator assembly comprising:
a positive electrode plate defining a first surface area, the positive electrode plate comprising a grid and active material;
wherein said grid comprises a first grid edge and a second grid edge, and wherein said grid has a grid thickness less than approximately 1.0 mm;
a porous membrane disposed adjacent to said electrode plate, said porous membrane comprising a first membrane surface having a first side lane adjacent to a first membrane edge, a second side lane adjacent to a second membrane edge, and a central portion disposed between said first side lane and said second side lane;
a plurality of primary ribs extending from or into said first membrane surface within said central portion, said primary ribs comprising forty-three toothed ribs arranged in rows, each row offset at least partially from adjacent rows, the primary ribs spaced at a Pitchtooth of from 3.0 to 6.0 mm, the primary ribs having an average tip length, TipLTooth from 50 microns to less than 1.0 mm, an average tooth base length BaseLTooth from greater than 50 µm to 1.0 mm, an average height, HeightPosRib from 50 µm to 1.0 mm, and an average height to base width ratio from 0.1:1.0 to 500:1.0, and a first array of secondary ribs disposed within said first side lane and a second array of secondary ribs disposed within said second side lane; and
wherein the primary ribs are the only ribs within said central portion and all of the primary ribs are longitudinally disposed in a machine direction of the porous membrane, and further wherein the first array of secondary ribs are the only ribs within said first side lane, the second array of secondary ribs are the only ribs within said second side lane, and all of the first array of secondary ribs and all of the second array of secondary ribs are laterally disposed in a cross-machine direction of the porous membrane, and further wherein the primary ribs contact 3.8% of the first surface area of the positive electrode plate.

2. The electrode and separator assembly of claim 1, wherein:
said first grid edge is disposed within said first side lane, and said second grid edge is disposed within said second side lane;
said grid comprises the active material disposed thereon, and wherein said active material is non-uniformly disposed on said grid;
said grid comprises a non-uniform geometry;
said plurality of primary ribs comprise a uniform height and a uniform distribution;
either or both of said first array of secondary ribs and said second array of secondary ribs are more closely spaced that said plurality of primary ribs;
any of said plurality of said first array of secondary ribs, or said second array of secondary ribs are one of the following group consisting of: solid ribs, discrete broken ribs, continuous ribs, discontinuous ribs, discontinuous peaks, discontinuous protrusions, angled ribs, diagonal ribs, linear ribs, ribs that are longitudinally extending approximately in a machine direction of said porous membrane discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof;

said grid is one of the group consisting of a stamped grid, a cast grid, and an expanded metal grid;
said grid is subject to warping;
said grid has a first grid surface and a second grid surface, and wherein said active material is more heavily distributed on said first grid surface as compared to said second grid surface;
said active material is non-uniformly distributed on a surface of said grid;
said porous membrane comprises a second membrane surface having a third array of ribs thereon; or
said porous membrane is one of the group consisting of an envelope separator, a hybrid envelope separator, a sleeve separator, a pocket separator, a wrap separator, a cut-piece separator, and a leaf separator.

3. The electrode and separator assembly of claim 1, wherein said porous membrane comprises a second membrane surface having a third array of ribs thereon.

4. The electrode and separator assembly of claim 2, wherein said porous membrane comprises a second membrane surface opposite said first membrane surface, the second membrane surface having a third array of ribs thereon, and wherein said third array of ribs are one of the following group consisting of: solid ribs, discrete broken ribs, continuous ribs, discontinuous ribs, discontinuous peaks, discontinuous protrusions, angled ribs, diagonal ribs, linear ribs, ribs that are longitudinally extending approximately in a machine direction of said porous membrane, ribs that are laterally extending approximately in a cross-machine direction of said porous membrane, ribs that are transversely extending approximately in said cross-machine direction of the separator, discrete teeth, toothed ribs, serrations, serrated ribs, battlements, battlemented ribs, curved ribs, continuous sinusoidal ribs, discontinuous sinusoidal ribs, S-shaped ribs, continuous zig-zag-sawtooth-like ribs, broken discontinuous zig-zag-sawtooth-like ribs, grooves, channels, textured areas, embossments, dimples, columns, mini columns, porous, non-porous, cross ribs, mini ribs, cross-mini ribs, and combinations thereof.

5. The electrode and separator assembly of claim 2, wherein said porous membrane is one of the group consisting of an envelope separator, a hybrid envelope separator, a sleeve separator, a pocket separator, a wrap separator, a cut-piece separator, and a leaf separator; and
wherein said porous membrane comprises at least one sealed edge formed from a crimp, a weld, an ultrasonic weld, a thermal weld, an adhesive, and combinations thereof.

6. The electrode and separator assembly of claim 1, wherein said active material is non-uniformly distributed on said grid.

7. The electrode and separator assembly of claim 6, wherein:
said first grid edge comprises at least a first grid corner, and said second grid edge comprises at least a second grid corner;
said first array of secondary ribs having a uniform height;
a support structure comprises a first fibrous mat adjacent to said first grid edge, and a second fibrous mat adjacent to said second grid edge;
said grid has a first grid surface and a second grid surface, and wherein said active material is more heavily distributed on said first grid surface as compared to said second grid surface;
said active material is non-uniformly distributed on a surface of said grid;
said grid is one of the group consisting of a stamped grid, a cast grid, and an expanded metal grid; and
said electrode plate is subject to warping.

8. The electrode and separator assembly of claim 6, wherein
further comprising a fibrous mat.

9. The electrode and separator assembly of claim 6, wherein said porous membrane is one of the group consisting of an envelope separator, a hybrid envelope separator, a sleeve separator, a pocket separator, a wrap separator, a cut-piece separator, and a leaf separator, and optionally wherein: said porous membrane is one of the group consisting of an envelope, and a hybrid envelope, a sleeve separator, a pocket separator, and a wrap separator;
wherein said porous membrane comprise at least one sealed edge formed from a crimp, a weld, an ultrasonic weld, a thermal weld, an adhesive, and combinations thereof.

10. A lead acid cell or battery comprising the electrode and separator assembly of claim 1, wherein:
said battery operates in one of the following states consisting of in motion, stationary, in a backup power application, in deep-cycling applications, in cycling applications, in a partial state of charge, and combinations thereof; or
said battery is selected from the group consisting of: a flat-plate battery, a flooded lead acid battery, an enhanced flooded lead acid battery ("EFB"), a valve regulated lead acid ("VRLA") battery, a deep-cycle battery, a gel battery, an absorptive glass mat ("AGM") battery, a tubular battery, an inverter battery, a vehicle battery, a starting-lighting-ignition ("SLI") vehicle battery, an idle-start-stop ("ISS") vehicle battery, an automobile battery, a truck battery, a marine battery, a motorcycle battery, an all-terrain vehicle battery, a forklift battery, a golf cart battery, a hybrid-electric vehicle battery, an electric vehicle battery, an e-rickshaw battery, an e-trike battery, and an e-bike battery.

11. A system comprising the lead acid cell or battery of claim 10, wherein-optionally:
said system further comprises a vehicle, wherein said vehicle is selected from the group consisting of an automobile, a truck, a motorcycle, an all-terrain vehicle, a forklift, a golf cart, a hybrid vehicle, a hybrid-electric vehicle, an electric vehicle, an idle-start-stop ("ISS") vehicle, a water vessel, an e-rickshaw, an e-trike, and an e-bike;
said system operates in one of the following states consisting of in motion, stationary, in a backup power application, in a deep-cycle application, in cycling applications, in a partial state of charge, and combinations thereof; or
said system is one of the following group consisting of an uninterruptible power supply, an energy reserve system, a power backup system, a renewable energy storage system, and combinations thereof.

12. The electrode and separator assembly of claim 1, wherein said grid is approximately rectangular and defines first, second, third, and fourth corners, and further wherein said first and second corners and said first grid edge are disposed within said first side lane, and third and fourth corners and said second grid edge are disposed within said second side lane.

13. The electrode and separator assembly of claim 8, wherein said fibrous mat extends from said first grid edge to said second grid edge.

* * * * *